United States Patent [19]

Stockmann

[11] Patent Number: 5,791,860
[45] Date of Patent: Aug. 11, 1998

[54] HYDRAULIC PLATFORM LIFT FOR A TRUCK TAILGATE

[75] Inventor: Thomas H. Stockmann, Ingersoll, Canada

[73] Assignee: Holland Equipment Limited, Norwich

[21] Appl. No.: 789,505

[22] Filed: Jan. 27, 1997

[51] Int. Cl.[6] .................................................. B60P 1/44
[52] U.S. Cl. .......................... 414/545; 91/171; 187/242; 187/274; 254/89 H
[58] Field of Search .................................. 414/540, 545; 91/171; 187/242, 274; 254/89 H

[56] References Cited

U.S. PATENT DOCUMENTS

| | | | |
|---|---|---|---|
| 2,347,368 | 4/1944 | Rosen | 91/521 |
| 2,932,171 | 4/1960 | Ranson | 91/171 X |
| 2,969,647 | 1/1961 | Raymond | 91/171 |
| 3,349,669 | 10/1967 | Richardson | 91/171 |
| 3,605,561 | 9/1971 | Lado | 91/522 |
| 4,405,279 | 9/1983 | Davy et al. | 414/558 |
| 4,679,489 | 7/1987 | Jasinski et al. | 91/171 X |
| 5,065,844 | 11/1991 | Hor | 91/171 X |
| 5,110,251 | 5/1992 | Gray | 414/545 |

OTHER PUBLICATIONS

PQ Controls Inc. 2–page brochure for "Automatic Platform Leveler Model 410"—Nov. 1994 (Copy enclosed).

*Primary Examiner*—David A. Bucci
*Attorney, Agent, or Firm*—Gowling, Strathy & Henderson; D. Doak Horne

[57] ABSTRACT

A hydraulic platform lift for trucks, having hydraulic and electrical circuitry to provide automated, or automated with manual override, platform levelling capability in the event the truck is tilted. Three embodiments are claimed where levelling may be accomplished in three separate ways; a first embodiment where levelling is accomplished by stopping one side of the platform and allowing the other side to "catch up", a second embodiment where levelling is accomplished by reversing the direction of movement of one side relative to the other to allow rapid levelling, and a third embodiment where the rate of movement of one side is slowed relative to the other, to allow the other side to "catch up" and thereby level the platform.

17 Claims, 32 Drawing Sheets

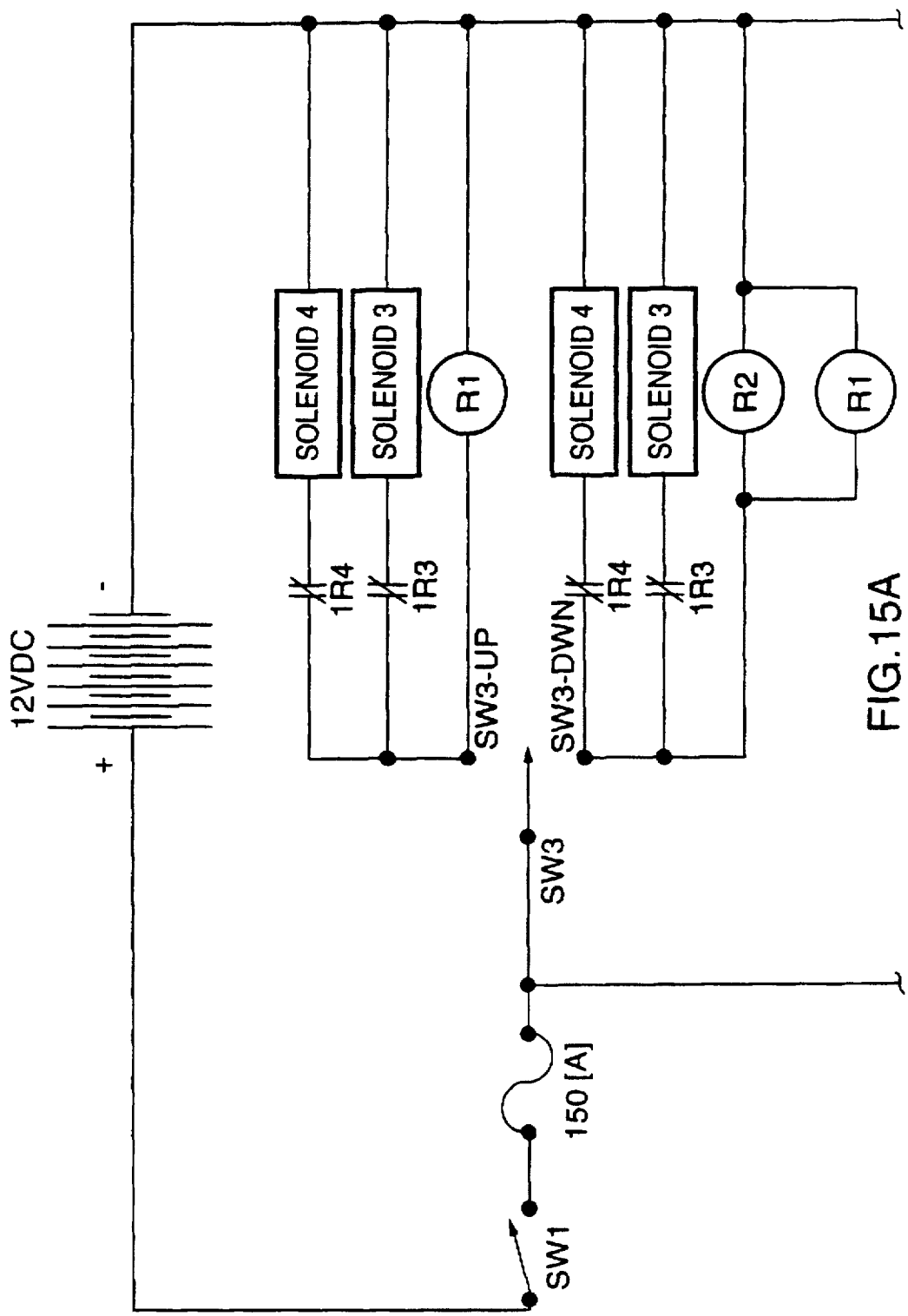

HYDRAULIC PLATFORM LIFT FOR A TRUCK TAILGATE

FIELD OF THE INVENTION

The present invention relates to a hydraulic platform lift for a truck or truck trailer tailgate, and more particularly to a hydraulic platform lift and hydraulic electric circuitry therefore to allow automatic levelling of the platform during raising and lowering of the platform, particularly when the truck may be on non-level ground.

BACKGROUND OF THE INVENTION

Hydraulic platform lifts for truck tailgates are well known. Early commercial designs, such as that depicted in FIG. 1 of U.S. Pat. No. 4,405,279 to a Tailgate Loader which is adapted to be stored under the rear upper chassis of a truck, employ a lift platform 14, a single hydraulic cylinder 20, and a parallelogram linkage 18. Such linkage 18 pivots about a fixed axis as the platform 14 is raised and lowered so as to maintain the platform 14 continuously in a plane parallel to the plane of the bed of the cargo area of the truck regardless of the unevenness of weight distribution of the cargo load on the platform 14. Disadvantageously, however, no provision is made in this design to adjust the platform to a level condition if the truck should be situated on unlevel ground. In such case, should the truck be tilted due to being on unlevel ground as often occurs during loading or unloading of trucks, the platform will likewise be tilted, making loading and unloading of cargo on the tilted platform difficult, and in certain cases, with heavy unstable cargo, extremely dangerous.

More recent designs, such as the Hydraulic Platform Lift for Truck Trailers disclosed in FIG. 1 of U.S. Pat. No. 5,110,251, which is mounted on the tailgate of a truck 6, utilize two vertically mounted dual-acting hydraulic cylinders 10, one on each side of a cargo door 12, to allow raising and lowering of a platform 18. Disadvantageously, however, these designs make no provision for automatically adjusting the relative extension/retraction of the cylinders 10 relative to each other should the truck be on unlevel ground to thereby place the platform in a level position. For example, U.S. Pat. No. 5,110,251 discloses the two dual-acting cylinders being connected in series for the purpose of attempting as much as possible to cause the two cylinders to move in unison. Such design makes no provision for adjusting the relative extension/retraction of the cylinders 10 relative to each other should the truck be on unlevel ground to thereby obtain a level platform during the raising and lowering of the platform. The only "levelling" feature disclosed in U.S. Pat. No. 5,110,251 is a cumbersome and time-consuming procedure whereby, should the cylinders 10 become unevenly extended/retracted as often occurs due to uneven distribution of load on the platform and thus on the two cylinders, the platform 18 must be raised to its fully raised position so as to then cause the cylinders to once again become evenly aligned upon reaching the end of their travel. As can thus be seen, such prior art designs make no use of apparatus or means for intentionally and automatically unevenly extending/retracting the cylinders relative to each other so as to cause the platform to become level, as is necessary when the truck is tilted due to being on unlevel ground. Great difficulty is therefore encountered with such designs in unloading cargo from a truck where the truck, and thus the platform, is tilted, resulting in increased risk of damage to cargo due to cargo slipping or sliding off the platform, and injury to operators due to cargo slipping and falling onto such operators.

SUMMARY OF THE INVENTION

In order to overcome the shortcomings of the prior art hydraulic platform lifts, it is an object of the present invention to provide a hydraulic platform lift which is able to automatically level itself during raising and lowering regardless of (within reasonable limits) the tilt of the truck and the uneven distribution of load on the platform which might otherwise, due to tilt of the track or uneven loading of the cylinders, cause the platform to become tilted during raising and lowering thereof.

Accordingly, in one of its broad aspects the present invention provides for a hydraulic platform lift for use in raising and lowering a platform for loading cargo into, and for unloading cargo from, a storage area of a truck or trailer, comprising:

a) a pair of vertically-mounted, dual acting, hydraulic cylinders, each having pistons, which each utilize hydraulic fluid applied at a lower end thereof and at an upper end thereof to raise and lower, respectively, the respective sides of the platform;

b) first conduit means in communication with the lower end of each of the hydraulic cylinders to allow passage of hydraulic fluid to and from the lower end of the cylinders;

c) second conduit means in communication with the upper end of each of said cylinder;

d) pump means for supplying hydraulic fluid under pressure;

e) a hydraulic fluid reservoir;

f) electrically activated valve switching means, preferably in the form of electrically activated solenoid valve means, to allow switching of supply of hydraulic fluid from a first position whereby hydraulic fluid is supplied by the pump means to the lower end of the cylinders via the first conduit means and simultaneously allowed to return to the reservoir via the second conduit means to thereby raise the platform, and a second position whereby hydraulic fluid is supplied to the upper end of the cylinders via the second conduit means and simultaneously allowed to return to said reservoir via the first conduit means to thereby lower the platform;

g) left and right electrically-activated flow control valves, preferably solenoid valves, for controlling flow of hydraulic fluid exiting from the lower end of an associated cylinder, each independently switchable when the electrically-activated valve switching means is in the second position, from a first position allowing egress of hydraulic fluid from the lower end of the associated cylinder to a second position preventing egress of hydraulic fluid from the lower end of the associated cylinder; and h) automatic level control means, comprising:
 i) means for detecting the non-evenness of the platform during lowering of the platform, and selecting which of the flow control valves need be switched to return the platform to a level condition; and
 ii) means for switching the selected one of the flow control valves when a non-level condition of the platform is detected so as to cause the selected flow control valve to switch position to thereby change the quantum of flow of hydraulic fluid exiting from the lower end of the associated cylinder in relation to that exiting from the lower end of the other cylinder and thereby change the rate of lowering of such cylinder relative to the other to thereby adjust the platform to a level position.

A hydraulic platform lift employing the aforementioned means and hydraulic circuitry provides a level platform during at least the lowering of the platform. The invention, however, is not limited to merely providing a level platform during the lowering of such platform, but as more fully explained below is adapted for stabilizing the platform during the raising of such platform as well.

Thus in a preferred (first) embodiment, each of the flow control valves is in fluid communication with and controls passage of hydraulic fluid to and from the lower end of the associated cylinder. In such embodiment the automatic level control means, which possesses means for detecting the non-levelness of the platform during the raising and lowering of the platform, further possesses means for switching the selected flow control valve, and more particularly means for de-activating a selected one of the flow control valves so as to cause such flow control valve to prevent egress of hydraulic fluid from the lower end of an associated cylinder thereby stopping movement of an associated piston and the associated side of the platform to which such piston is coupled. Likewise, when the switching valve means are in the first position and the platform is being raised, the automatic control means similarly causes the selected flow control valve to switch to a position preventing supply of hydraulic fluid to the lower end of an associated cylinder, thereby stopping the movement of the associated piston and the associated side of the piston to which such piston is coupled, and allowing the other side of the platform which continues to move to "catch up". Accordingly, in such above manner hydraulic circuitry allows the automatic level control means to level the platform while the platform is being both raised or lowered.

It is further possible, and this invention further contemplates, in a second embodiment which is an improvement on the first embodiment, using the aforementioned components to cause the platform to be more rapidly brought to a level state by simultaneously raising one side of the platform and at the same time lowering the other. This is achieved in such embodiment by the automatic level control means additionally causing one of two solenoid switching valves which in this embodiment comprise the switching valve means, to remain in a first position causing one side of the platform to be raised when the associated flow control valve is in the second position, but at the same time also causing the other switching valve to move to the second position with its associated flow control valve remaining in the first position, thereby causing the other associated side of the platform to be lowered, instead of simply stopped, and this more rapidly bringing the platform to a level condition.

Accordingly, in this preferred second embodiment, the invention comprises a vehicle-mounted hydraulic platform lift for use in raising and lowering a platform for loading cargo into, and unloading said cargo from, a cargo storage area of a truck or truck trailer, comprising:

a) left and right vertically-mounted, dual acting hydraulic cylinders which each utilize hydraulic fluid supplied at the lower end and upper end thereof to raise and lower, respectively, the platform;

b) each cylinder having:
   i) a first conduit in communication with said lower end thereof to allow passage of hydraulic fluid to and from said lower end of said cylinder; and
   ii) a second conduit in communication with said upper end thereof;

c) pump means for supplying hydraulic fluid under pressure to said cylinders;

d) a hydraulic fluid reservoir;

e) left and right electrically-activated switch valves associated with a respective left and right cylinder, to allow switching of hydraulic fluid from a first position whereby hydraulic fluid is supplied by said pump means to the lower end of respective cylinder via said first conduit and simultaneously allowed to return to the reservoir from the cylinder via said second conduit, and a second position whereby hydraulic fluid is supplied to the upper end of a respective cylinder via the second conduit and simultaneously allowed to return to the reservoir via the first conduit;

f) left and right electrically-activated flow control valves, associated with a respective left and right cylinder and left and right switch valve, in fluid communication with the first conduit, for controlling flow of hydraulic fluid into or out of the lower end of a respective cylinder via said first conduit;

g) each of said left and right control valves independently switchable when the respective switch valve is in said second position, from a first position allowing egress of hydraulic fluid via said first conduit from the lower end of an associated cylinder to a second position preventing egress of hydraulic fluid therefrom, and when the respective switch valve is in said first position, switchable from a second position allowing entry of hydraulic fluid via the first conduit into the lower end of an associated cylinder to a first position preventing entry of hydraulic fluid into the lower end of said associated hydraulic cylinder;

h) automatic level control means, comprising:
   i) means for detecting the non-levelness of the platform during raising and lowering of the platform, and selecting which of said left and right flow control valves need be switched to return the platform to a level condition;
   ii) means for switching, when a non-level condition of the platform is detected and the switching valves are in said second position and the platform is being lowered, a selected one of said left and right electrically-activated flow control valves, and the associated switch valve, to switch from said first position allowing egress of hydraulic fluid from the lower end of an associated cylinder and preventing supply of hydraulic fluid to the lower end, to said second position preventing egress of hydraulic fluid from the lower end and allowing supply of hydraulic fluid thereto, and switching the associated switch valve from said second position to said first position, to thereby stop downward movement of an associated side of the platform to which an associated piston is coupled and cause the associated side to move in an upward direction;
   iii) means for switching, when a non-level condition of the platform is detected and the switching valves are in said first position and the platform is being raised, a selected one of said left and right flow control valves and the associated switch valve, so as to cause said selected one of said flow control valves to switch from said second position allowing supply of hydraulic fluid to the lower end of an associated cylinder and preventing egress of hydraulic fluid from the lower end, to said first position preventing supply of hydraulic fluid to the lower end of an associated cylinder and allowing egress of hydraulic fluid therefrom, and switching the associated switch valve from said first position to said second position to thereby stop movement of an associated side of the platform to which an associated piston is coupled and cause the associated side to move in an upward direction.

In a variation of the second embodiment where one of the cylinders is caused to reverse direction so as to accomplish levelling of the platform, the present invention allows the aforementioned two switching valves and flow control valves to regulate the flow of hydraulic fluid in a manner as above described, whereby when the platform is being raised and, for example one side is higher than the other, the switching valves and the flow control valves stop the raising of the lowest side, and reverse the raising of the other side [ie. cause it to be lowered], so as to cause the platform to come to a level position, whereby the switch valves and flow control valves are then controlled so as to allow both sides of the platform to be raised so that the platform will then be raised in a level position. Conversly, when the platform is being lowered and one side is lower than the other, in this variation to the second embodiment, the switch valves and the flow control valves may be caused to stop flow of hydraulic fluid to/from the cylinder attached to the highest side of the platform, and the hydraulic cylinder controling the lowest side of the platform caused to be reversed [ie. cause it to raise the lowest side] so as to cause the platform to come to a level position, whereby the switch valves and flow control valves are then controlled so as to allow both sides of the platform to be lowered so that the platform will then continue to be lowered in a level position.

In a third (but less preferred embodiment), which likewise provides levelling of the platform during the raising or lowering thereof, but like the first embodiment when levelling the platform simply stops one side of the platform from moving and allows the other side to continue moving in the desired direction so as to thereby "catch up", each of the left and right flow control valves do not control the flow to and from the lower end of an associated cylinder, but rather control only the flow leaving the associated cylinder. In such third embodiment the switching means comprises a single switching valve. Accordingly, in this third embodiment, the automatic control means possesses means for, when the platform is being lowered and the single switching valve is in the second position, switching one of the two flow control valves so as to cause such control valve to allow egress of hydraulic fluid from the lower end of the associated cylinder via the third conduit, to thereby increase the descent of the associated side of the platform relative to the other side. When the platform is being raised and the switching valve is in the first position allowing hydraulic fluid to be supplied to the lower end of each cylinder, the automatic control means likewise, when a non-level condition is detected, activates the appropriate flow control valve causing it to open which now causes a release of pressurized hydraulic fluid being supplied to the associated cylinder during raising, thereby causing the associated piston in the associated cylinder to rise less rapidly than its counterpart, thus levelling the platform.

Each of the first, second and third embodiments utilize control means to change the flow of hydraulic fluid, namely the rate of flow, exiting from the lower end of the associated cylinder in relation to that permitted to exit from the lower end of the other cylinder, to thereby level the platform as it is being lowered. In the first (preferred) embodiment, the selected flow control valve corresponding to the piston and the cylinder which is coupled to the lowest side of an uneven platform is caused to close, thus stopping the movement of the associated piston and allowing the piston in the other cylinder to continue moving thus allowing the other side of the platform to be brought level with the first side. In the second preferred embodiment, one of the sides of the platform is not only stopped, but caused to move in the direction opposite to that which it was moving to bring it more quickly level with the other side of the platform. By way of contrast, in the third embodiment, the selected control valve corresponding to the piston which is coupled to the highest side of an uneven platform is caused to open, thus allowing hydraulic fluid to exit more rapidly from the lower end of the associated cylinder and the associated piston is thereby caused to descend more rapidly relative to that of the other cylinder.

Advantageously, the first and second embodiments are particularly preferred over the third embodiment because of the first and second embodiments' adaptability to allow use of two separate pumps, one for each hydraulic cylinder, to thereby form two separate hydraulic circuits. It has been found that utilization of two independent hydraulic circuits is particularly useful in the event of failure of the automatic level control means, and manual levelling of the platform (discussed below) is needed. In particular, in the third embodiment which is not adapted for an independent hydraulic system, and generally for such reason only utilizes a single hydraulic pump (hereinafter "the simple pump system") with the automatic leveller disabled such single pump system will force the greatest amount of hydraulic fluid to the piston with the least resistance. In the absence of a functioning automatic level control means, where the weight of platform and cargo thereon is not evenly divided between the two pistons and associated cylinders, the platform will accordingly go out of level very quickly. On the other hand, with the components and hydraulic circuitry of the first and second preferred embodiments, and where two hydraulic pumps are utilized to thereby provide an independent hydraulic circuit for each cylinder (hereinafter "the tandem system"), even with uneven distribution of the weight on the platform, identical positive displacement pumps running at identical speeds will cause their associated pistons and cylinders to for the most part extend and retract equal amounts. Accordingly, in the tandem system there is much less requirement to manually adjust the levelling of the platform using the manual override system, as discussed below, in the event of failure of the automatic levelling means, assuming the platform is level at the time of failure of the automatic level control means.

Notably, due to the vibration and harsh environment that trucks are exposed to, and due to the sensitive nature of the level control means, it is possible that the automatic level control means may become damaged and become inoperative or defective in operation. Accordingly, as a safety feature, even in the tandem system where such feature is not as necessary as in the single pump system, to help prevent injury to platform lift operators should the automatic level control means incorporated in the present invention suddenly cease operating or commence operating incorrectly during raising or lowering of the platform, a manual switching system is further provided to allow override or disconnection of the level control means in the event of failure thereof, and allow manual levelling of the platform. Such feature advantageously may be added to the hydraulic platform lift of either the first or second preferred embodiment (tandem system), or the third embodiment (single pump system).

Accordingly, in such further refinement to the tandem system (first embodiment) and the single pump system (third embodiment) of the present invention, the present invention further provides means for disengaging the automatic level control means in the event of failure thereof, and providing manually-operated electrical switch means for switching a selected one of the left and right flow control valves during at least the lowering of the platform so as to cause the selected flow control valve to switch position and thereby change the flow of hydraulic fluid exiting from the lower end of the associated cylinder relative to the flow of fluid exiting from the lower end of the other of said cylinders, to thereby allow adjustment of the rate of lowering of each side of the platform relative to the other. Advantageously, the manual override and operating means is likewise used to provide similar adjustment to the rate of raising of one side of the platform relative to the other, to allow levelling the two sides during raising of the platform.

A similar manual override and switching system can be further added to the second embodiment to provide a similar safety feature in the event of failure of the automation level control means.

BRIEF DESCRIPTION OF THE DRAWINGS

Further objects and advantages of the invention will be apparent from the following detailed description of the invention and the following drawings of the preferred embodiments of the invention, in which.

DETAILED DESCRIPTION OF THE INVENTION

Figure 1:
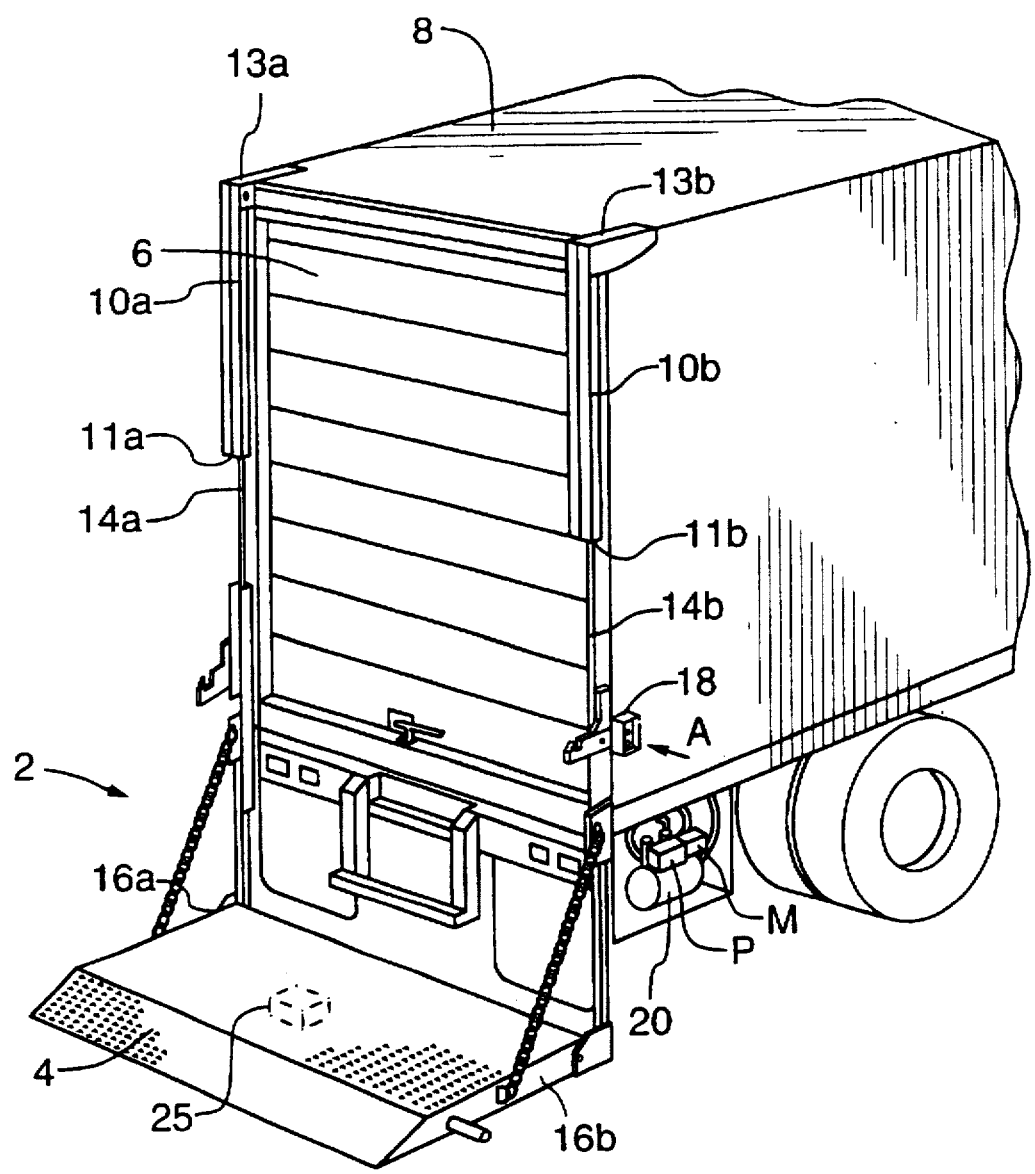
FIG. 1 is a perspective view of the rear of a truck tailgate having installed thereon a hydraulic platform lift of the present invention.
Figure 3A:
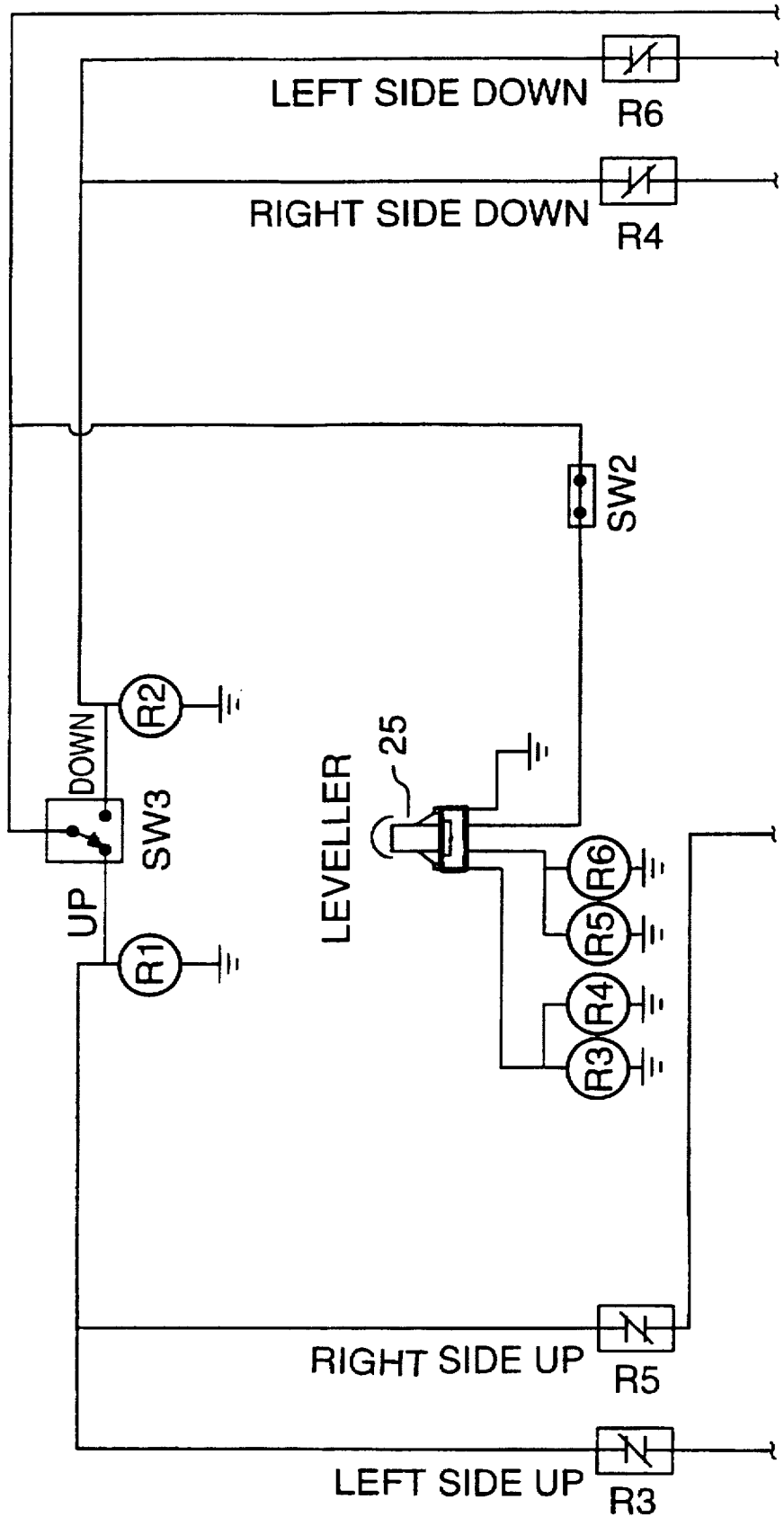
FIG. 3 is a schematic diagram of the integrated hydraulic and electrical system for the tandem system (first) embodiment of the present invention, showing the platform lift being operated in the "up" position, with pistons of both cylinders being driven upward.
Figure 3B:
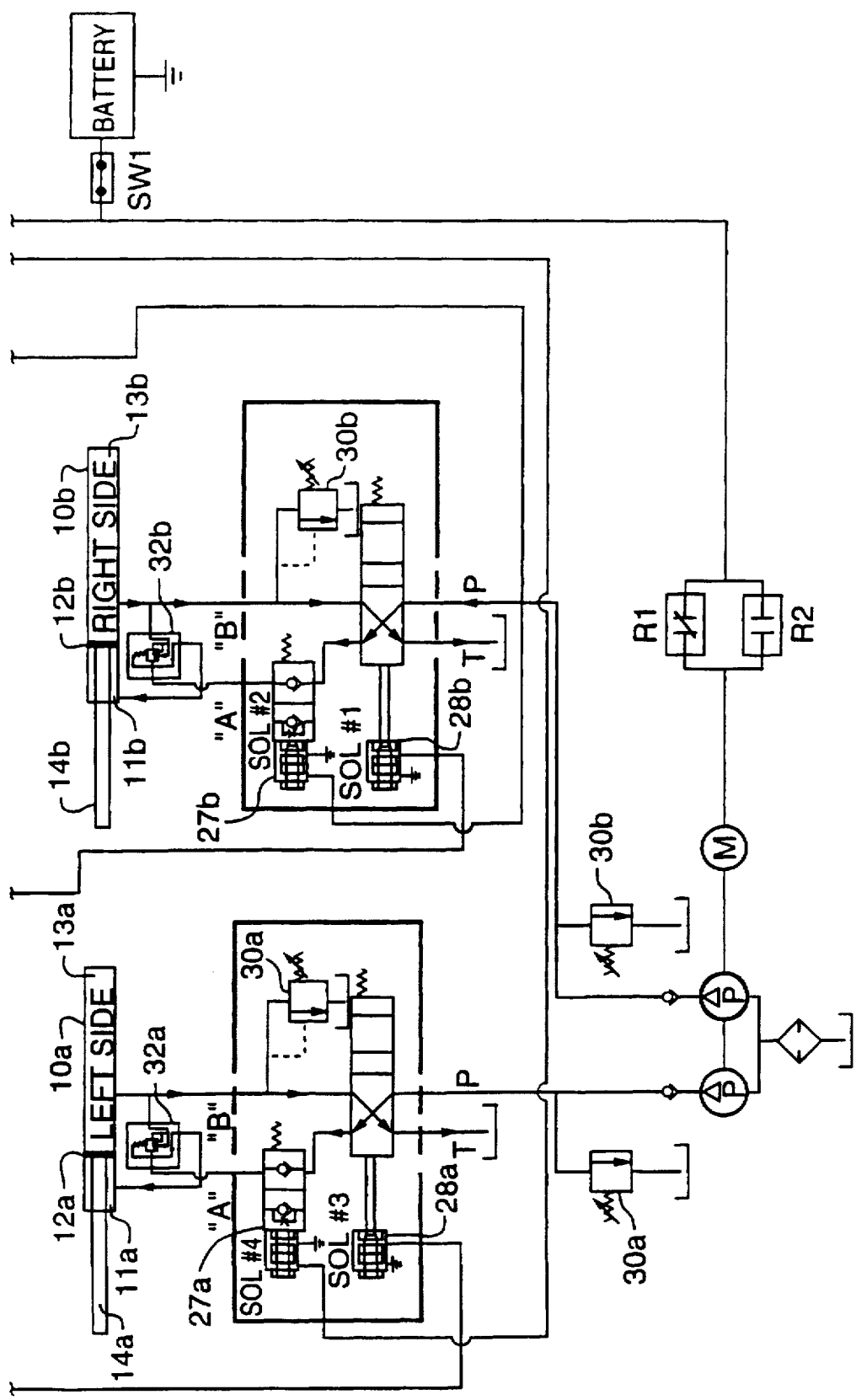
Figure 4A:
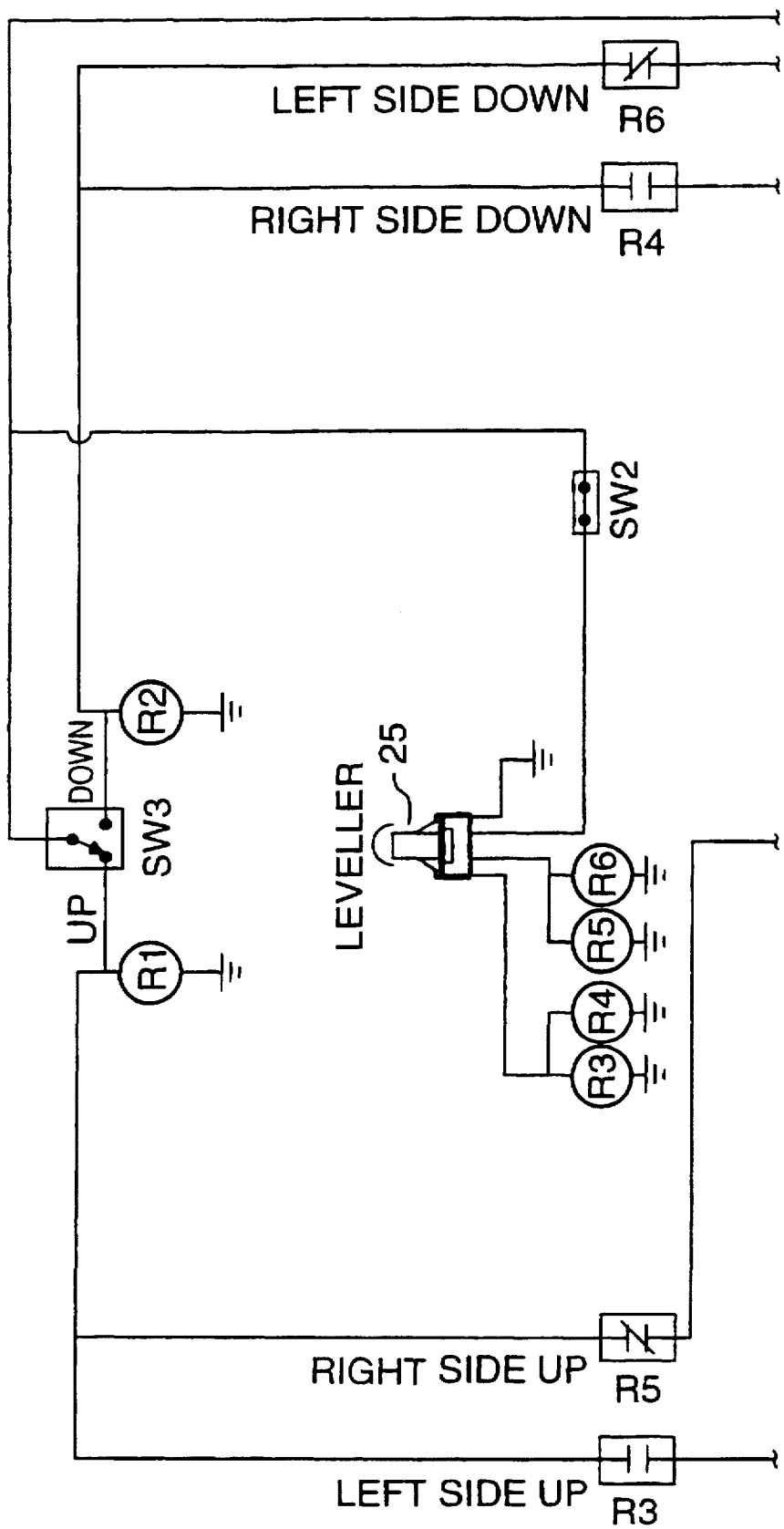
FIG. 4 is a schematic diagram of the integrated hydraulic and electrical system for the tandem system (first) embodiment of the present invention, showing the platform lift being operated in the "up" position, with the platform being in a "left side high" configuration and the left side piston being held stationary to correct such non-level condition.
Figure 4B:
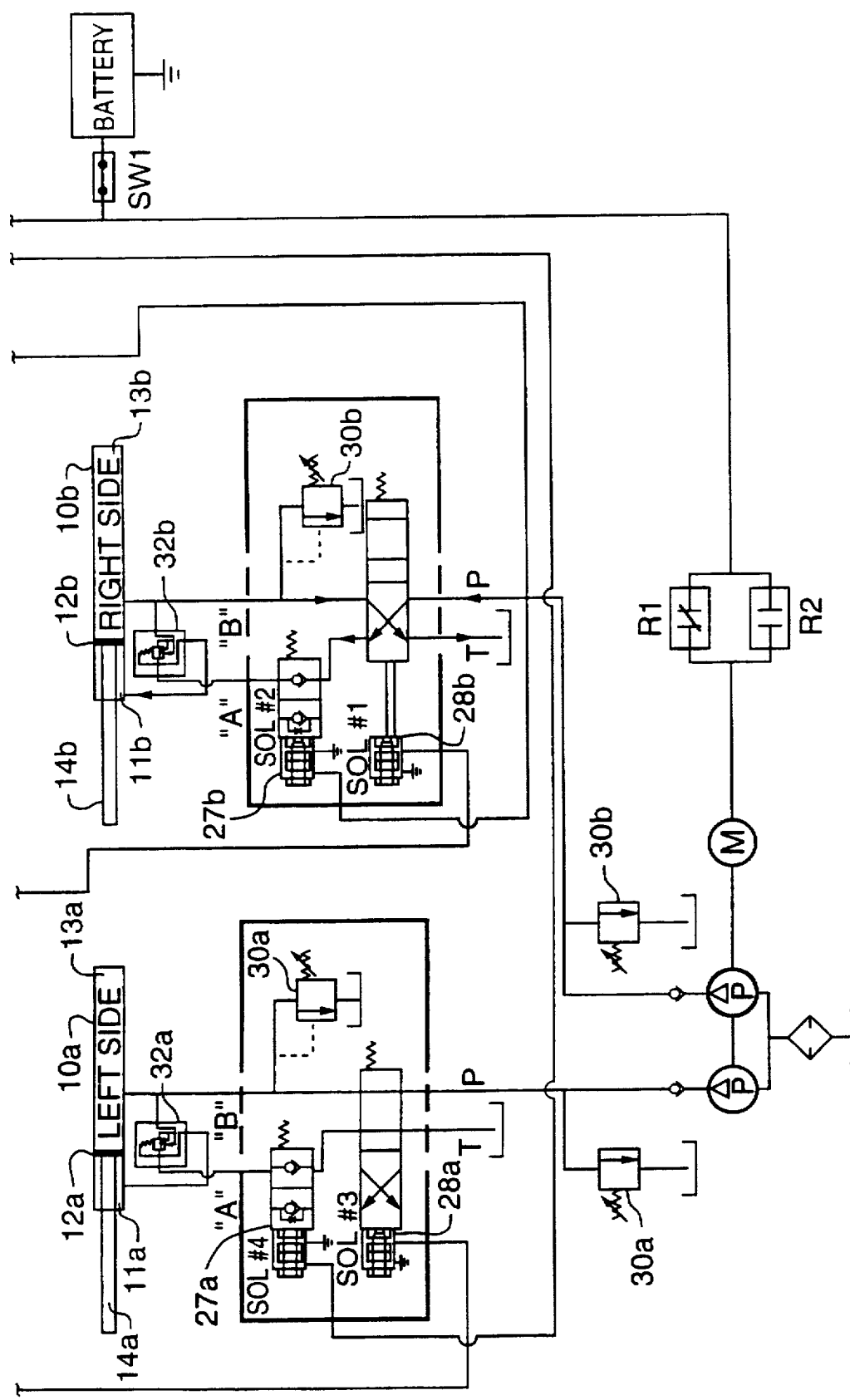
Figure 5A:
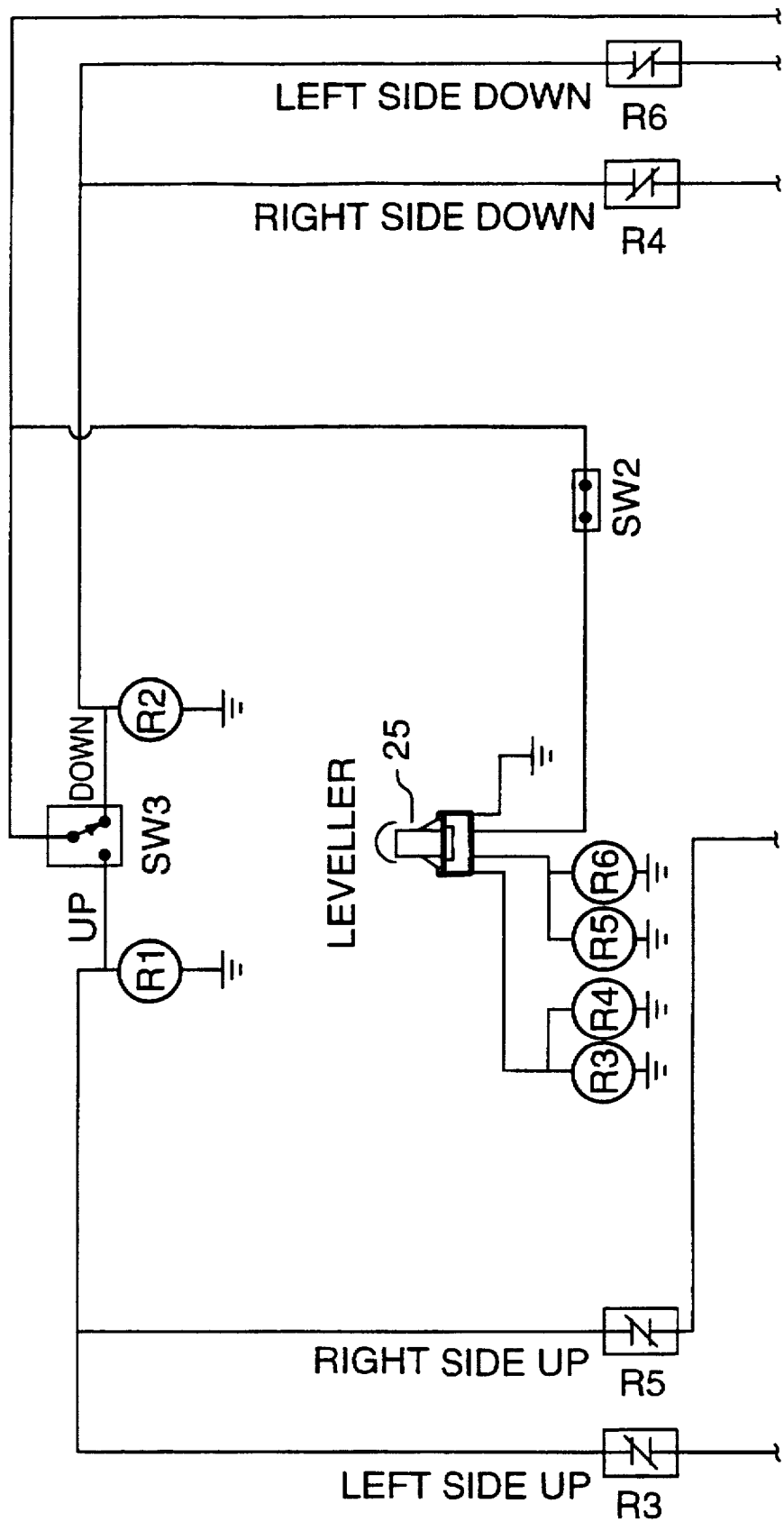
FIG. 5 is a schematic diagram of the integrated hydraulic and electrical system for the tandem system (first) embodiment of the present invention, showing the platform lift being operated in the "down" position, with pistons of both cylinders being driven downward.
Figure 5B:
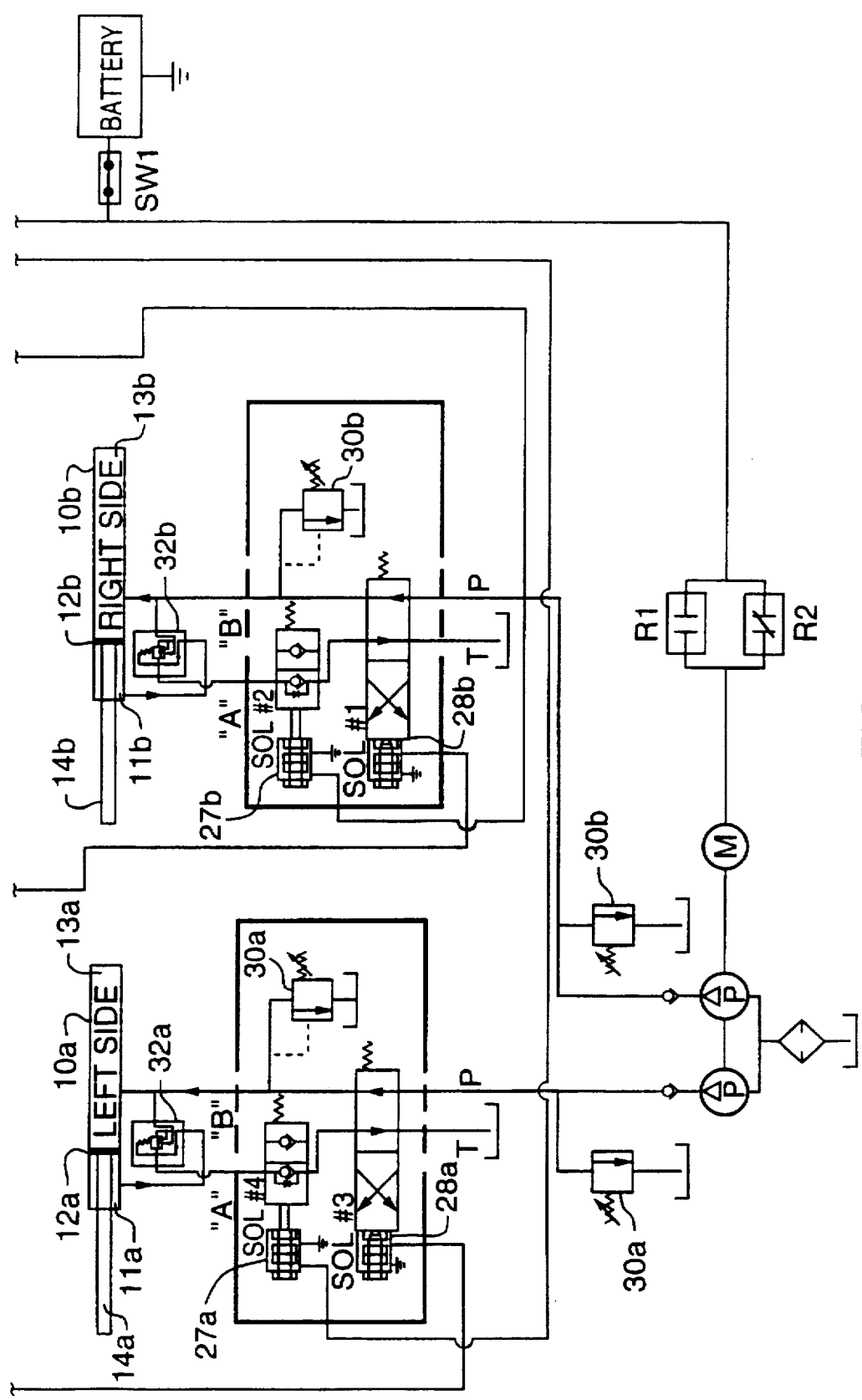
Figure 6A:
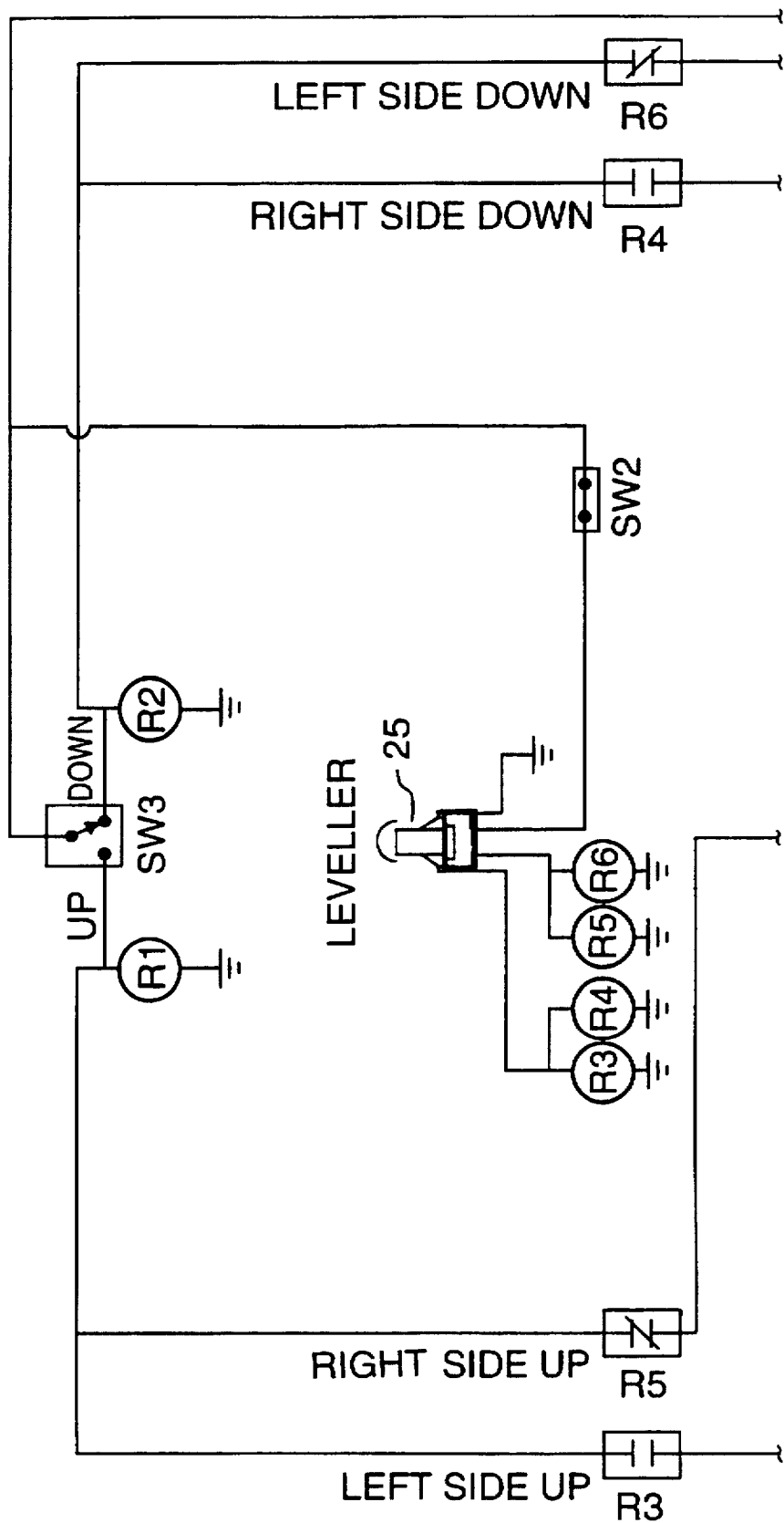
FIG. 6 is a schematic diagram of the integrated hydraulic and electrical system for the tandem system (first) embodiment of the present invention, showing the platform lift being operated in the "down" position, with the platform being in a "left side high" configuration, with the right side cylinder being held stationary to correct such non-level condition.
Figure 6B:
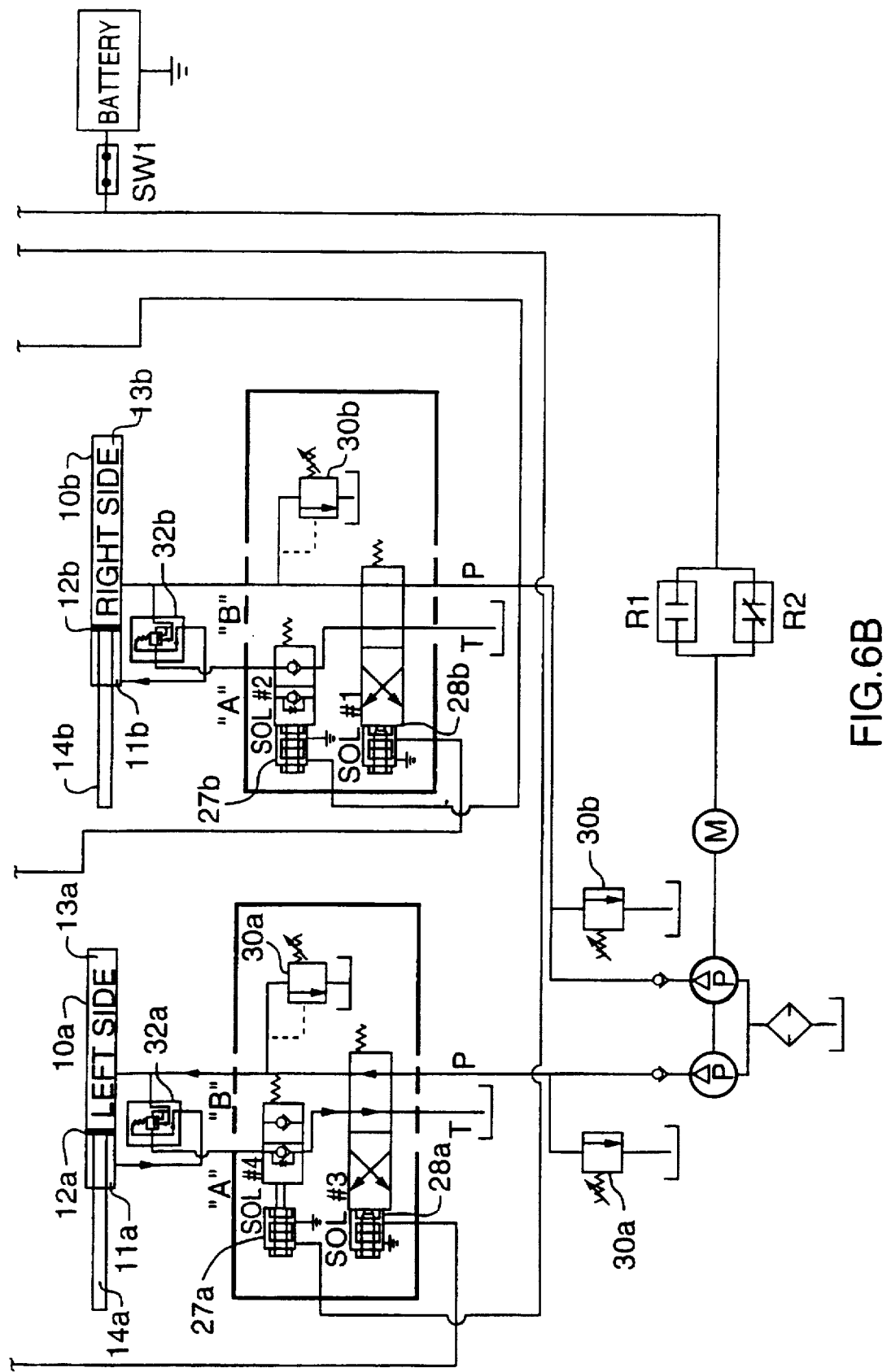

FIGS. 1 & 3 show a hydraulic platform lift 2 of the present invention for use in raising and lowering a platform 4 for loading cargo (not shown) into and from a cargo storage area 6 of a truck 8.

A pair of left and right dual acting cylinders 10a,b having lower ends 11a,b and upper ends 13a,b, are vertically mounted on opposite left and right rear sides of the cargo storage area 6 of the truck 8. Left and right pistons 12a,b within each of left and right cylinders 10a,b are each connected to associated rod arms 14a,b which are coupled to an associated left and right side 16a,b respectively of the platform 4, to allow such cylinders 10a,b and pistons 12a,b to raise and lower the platform sides 16a,b.

Importantly, in a preferred embodiment, each of the sides 16a,b of the platform 4 may be raised or lowered independently of the raising or lowering of the other side of the platform 4.

Pump means P, powered by motor means M, provides hydraulic pressure to the cylinders 10.

Figure 2B:
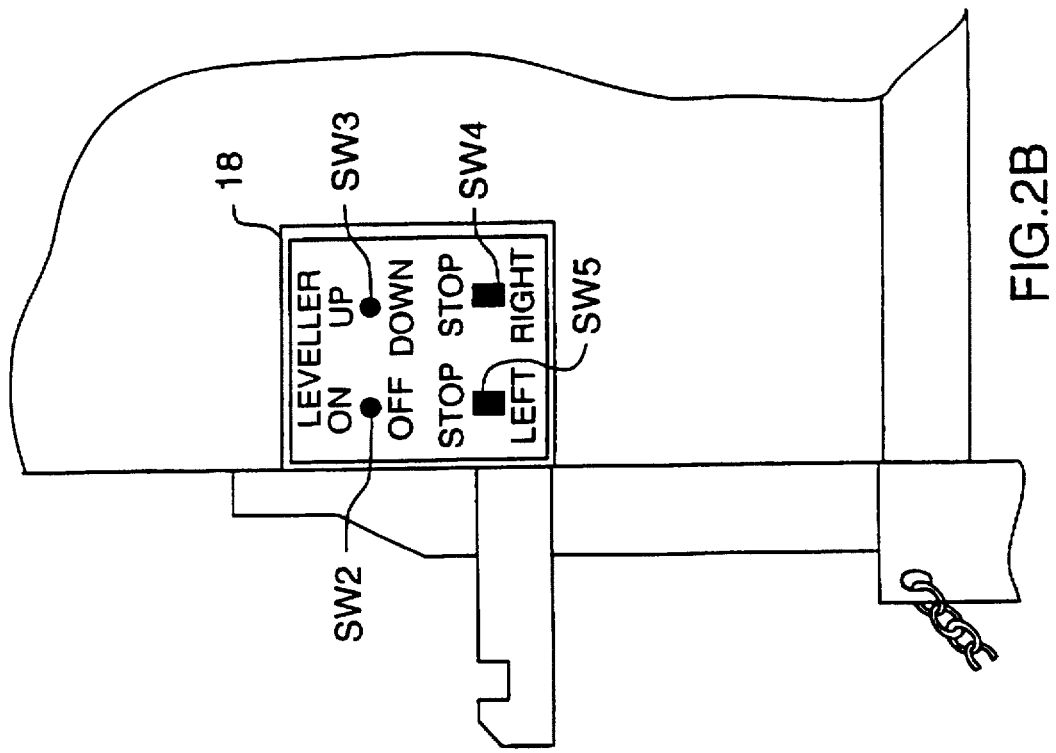
FIG. 2B is a view of Arrow A of FIG. 1, showing an alternate configuration for the controls for the present invention, where the present invention in its preferred embodiment possesses means for disabling the automatic level control device in the event of failure thereof and a manual override and control system to allow manual levelling of the platform.
Figure 2A:
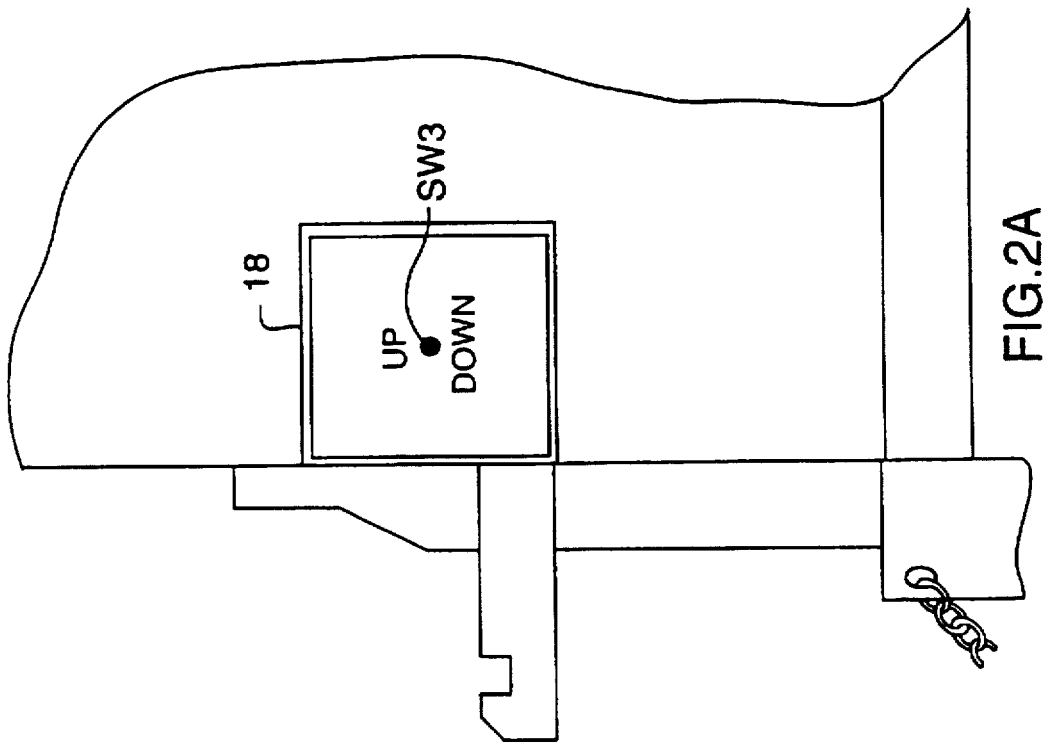
FIG. 2 is a view on Arrow A of FIG. 1, showing the raising and lowering platform controls for one embodiment of the present invention incorporating an automatic level control means.

A control box 18, as more fully shown in FIGS. 2a and 2b, is provided proximate the platform 4 to allow control of the lift 2 by the operator (now shown).

The control box 18 shown in FIG. 2b additionally possesses manual override switches SW4 and SW5, as more fully explained below, to allow manual control of the hydraulic platform lift 2 of the present invention.

Importantly, an automatic level control means, which in the preferred embodiment comprises a leveller 25 as more fully described below, is mounted on the platform 4, preferably on the underside thereof as shown in FIG. 1, which in conjunction with various solenoid valves and the hydraulic circuitry hereinafter fully described, provides the important advantage of automatic levelling of the platform 4 during the raising and lowering thereof by pistons 12a,b.

Detailed explanation of the three best mode embodiments of the present invention, and the various further improvements to each embodiment, will now be made.

In respect of the first embodiment (tandem pump system), shown in its broadest form and without further refinements in FIGS. 3–7, essentially two independent hydraulic circuits are provided to allow separate control of a respective cylinder 10a and 10b. Each hydraulic circuit comprises a respective cylinder 10a,b, pump means P, first conduit means "A" in communication with the lower and 11a,b of the associated cylinder 10a,b, second conduit means "B" in communication with the upper end 13a,b of the associated cylinder 11a,b, a solenoid switch valve 27a,b to allow switching of the flow of hydraulic fluid to the first conduit means "A" and to the second conduit means "B", a flow control valve 28a,b switchable from a first position allowing egress of hydraulic fluid from the lower end 11a,b of the associated cylinder 10a,b via the first conduit "A" and preventing supply of hydraulic fluid to the lower end 11a,b via the first conduit "A" and a second position preventing egress of hydraulic fluid from the lower end 11a,b via the first conduit "A" and allowing supply of hydraulic fluid to the lower end 11a,b of the association cylinder 10a,b via the first conduit "A", and lastly a hydraulic fluid reservoir or tank "T" is further provided which acts as a receptacle for hydraulic fluid. Each of the aforementioned hydraulic circuits is further provided with pressure relief valves 30a,b to avoid rupture of hydraulic supply lines and allow return of pressurized hydraulic fluid in the event the flow control valves 28a,b at switch valves 27a,b should be switched to prohibit supply of hydraulic fluid to the piston 10a,b.

The cylinders 10a,b and pump may be of any size and commercial manufacture, but the inventor has found that cylinders 10a,b of 2.5 inch dia. bore and approximately 57 inch stroke, adapted for a 3000 psi working pressure, manufactured by Pneu-hyde Corporation of Stoney Creek, Ontario to be of acceptable size and capacity. Advantageously, as a standard safety provision, such cylinders 10a,b are further provided with an internal Sun T-11a counterbalance valve 32a,b, which otherwise prevent the respective piston 12a,b from moving unless pump means "P" is able to generate sufficient differential pressure (approximately 1500 psi) at conduits "A" and "B" to allow these counterbalance valves 32a,b to open and the sides of the platform to thus be moved.

The solenoid switch valves 27a,b utilized in all embodiments are each 4-way and double-acting. The solenoid flow control valves 28a,b are of a 2-way design and in the embodiments shown in this invention all move when unenergized/de-activated to the first position, wherein hydraulic fluid is prevented from exiting the lower end of cylinder 10a,b. Such arrangement acts as a safety feature that in the event of bursting of, or leakage of hydraulic fluid from, the hydraulic circuit, or failure of electrical supply, the flow control valves 28a,b will default to their non-energized state (first position), thereby preventing the associated pistons 12a,b and the associated sides 16a,b of the platform 4 from being lowered and thus preventing the platform cargo thereon from suddenly dropping due to loss of hydraulic pressure.

In all embodiments of the invention a leveller 25 is provided. Advantageously the leveller 25 in combination with various electrical relays whose operation will hereinafter be described, is capable of determining whether electrical current is to be supplied to the various flow control valves 28a,b and switching valves 27a,b. In the first embodiment shown in FIGS. 3–7, the leveller 25 mounted on platform 4 supplies electrical current to relays $R_3$ and $R_4$ in the event the left side of 16a of the platform 4 is higher than the right side 16b during either the raising or lowering of the platform 4 (see FIG. 4). Likewise, in the event the right side 16b of the platform 4 is higher than the left side 16a during raising or lowering (FIG. 4), the leveller 25 is adapted to supply electrical current to relays $R_5$ and $R_6$ to thereby cause such relays to open. When the platform is in a level state, the leveller 25 does not supply current to any of relays $R_3$, $R_4$, $R_5$, or $R_6$.

With reference to the first embodiment of the present invention shown in FIGS. 3–7 inclusive, the manner of operation of the invention to achieve levelling of the platform 4 during raising or lowering will now be disclosed.

As shown in FIGS. 3–7, to commence operation, electrical current from the truck electrical supply or battery is provided to the electrical circuitry upon closing of switch SW1. Movement of switch SW3 to the "up" position will allow relay $R_1$ to be energized, thereby energizing motor "M" and pumps "P", and will further cause switching valves 28a,b (sol. #3 and #1 respectively) to become energized vias relays $R_3$ and $R_5$, which unless current is received from leveller 25, always remain in the closed state. Flow control valves 27a,b (sol. #4 and #2 respectively) remain in a de-energized state, even though relays $R_4$ and $R_6$ remain closed, due to SW3 not supplying power thereto if the platform 4 is in a level condition. As a result, hydraulic fluid will be supplied to the respective lower ends 11a,b of cylinders 10a,b and each of the sides 16a,b of the platform 4 will rise uniformly (see FIG. 3).

In the event the left side 16a of the platform 4 should be or becomes higher than the right side 16b, leveller 25 supplies electrical current to relays $R_3$ and $R_4$ thereby causing such relays to open and thereby cut electrical power to solenoid switch valve 28a (sol. #3) and solenoid control valve 27b (sol. #2), respectively, causing them to return to or remain in their unenergized state, with switch valve 28b continuing to be supplied with power due to relay $R_5$ remaining closed. Such causes the left piston 12a to cease moving and thus stops the left side 16a of the platform 4 to cease moving upward, allowing the right side 16b to "catch up", (see FIG. 4). Upon a level state being obtained, the system will return to that shown in FIG. 3. Conversely, in the event the right side 16b of the platform 4 becomes higher than the left side 16a, leveller 25 supplies electrical current to relays $R_5$ and $R_6$, thereby causing such relays to open and thereby cut electrical power to solenoid switch valve 28b (sol. #1) and solenoid control valve 27a (sol. #4) respectively. Such sequencing causes right piston 12b to cease moving and thus stops the right side 16b from moving upward, allowing the left side 16a to catch up.

Likewise, in the first embodiment when SW3 is moved to the "down" position to lower the platform, relay $R_2$ will become energized, thus again energizing motor M and pump P, and flow control valves 27a,b (sol. #4 and #2 respectively) will become energized via relays $R_4$ and $R_6$, which unless current is received from leveller 25 always remain in the closed state. Switching valves 28a,b each remain in a de-energized state, even though relays $R_3$ and $R_5$ remain closed, due to SW3 not supplying power thereto. As a result, hydraulic fluid will be supplied to the upper ends 13a,b of cylinders 10a,b and each of the sides 16a,b of the platform 4 will lower uniformly (see FIG. 5).

The operation of the circuitry in the event the left or right sides 16a,b of the platform 4 should be or become higher than the respective opposite side 16b,a is analogous to the "up" position. For example, where the left side of the platform 4 is higher leveller 25 will again supply electrical current to relays $R_3$ and $R_4$, thereby causing such relays to open and thereby cut electrical power to solenoid switch valve 28a (sol. #3) and flow control valve 27b (sol. #2) respectively, thereby causing them to be in an unenergized state. Due to current being continued to be supplied to flow control valve 27b due to relay $R_6$ remaining closed, right piston 12b will cease movement allowing left side 16a to "catch up". Likewise, a similar sequence is repeated in the event, during lowering, that right side 16b should be or become high (see FIG. 6).

Figure 7A:
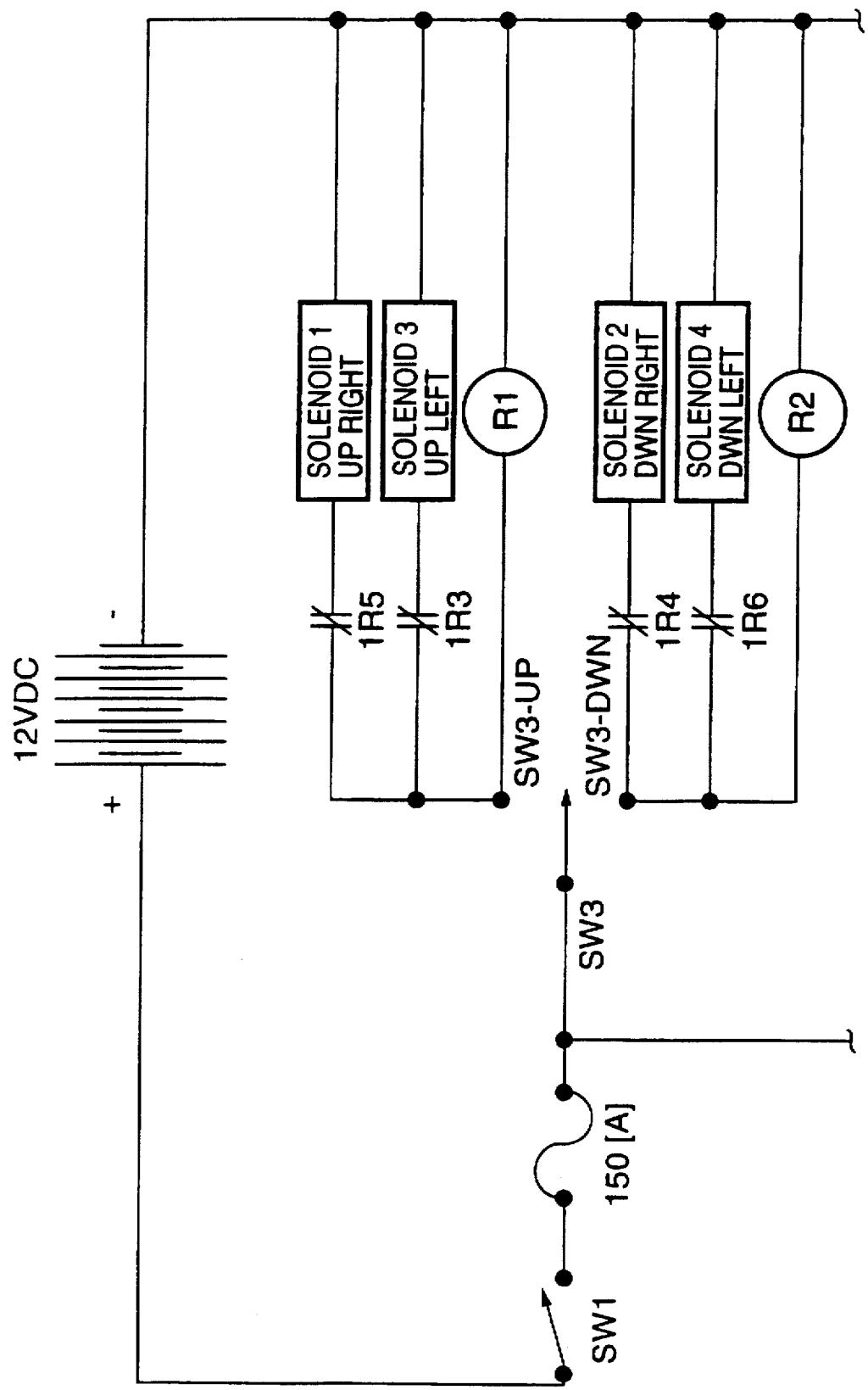
FIG. 7 is a detailed general electrical schematic of the tandem system (first) embodiment of the present invention shown in FIGS. 3–6.
Figure 7B:
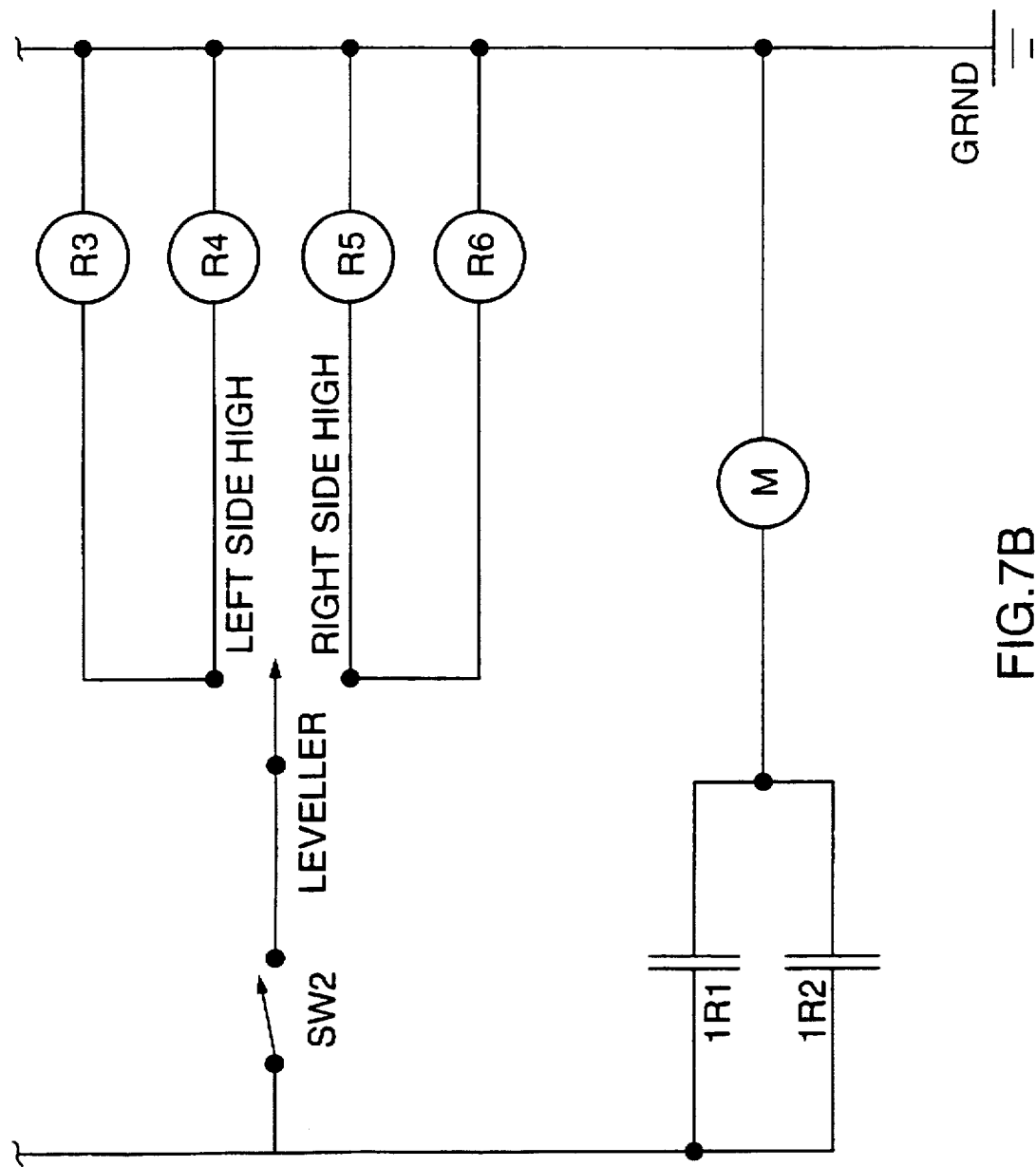

FIG. 7 shows a detail of the electrical circuit for the first embodiment of the invention to allow the leveller 25 to control the solenoid valves 27a,b and 28a,b in the manner above-described. Due to the platform lift 4 of this invention being adapted for use with trucks, a 12 volt electrical system is utilized. A particular leveller 25 adapted for use in the present invention, and in particular for use in the first and second embodiments, is a single-plane leveller containing a pendulum viscously damped with silicon fluid, made by PQ Controls Inc. of Bristol, Conn., U.S.A. Such leveller 25 is capable of providing a 1.0 amp continuous current to activate relays and/or solenoid upon sensing a non-level condition, utilizing a 12 volt power supply.

Figure 8A:
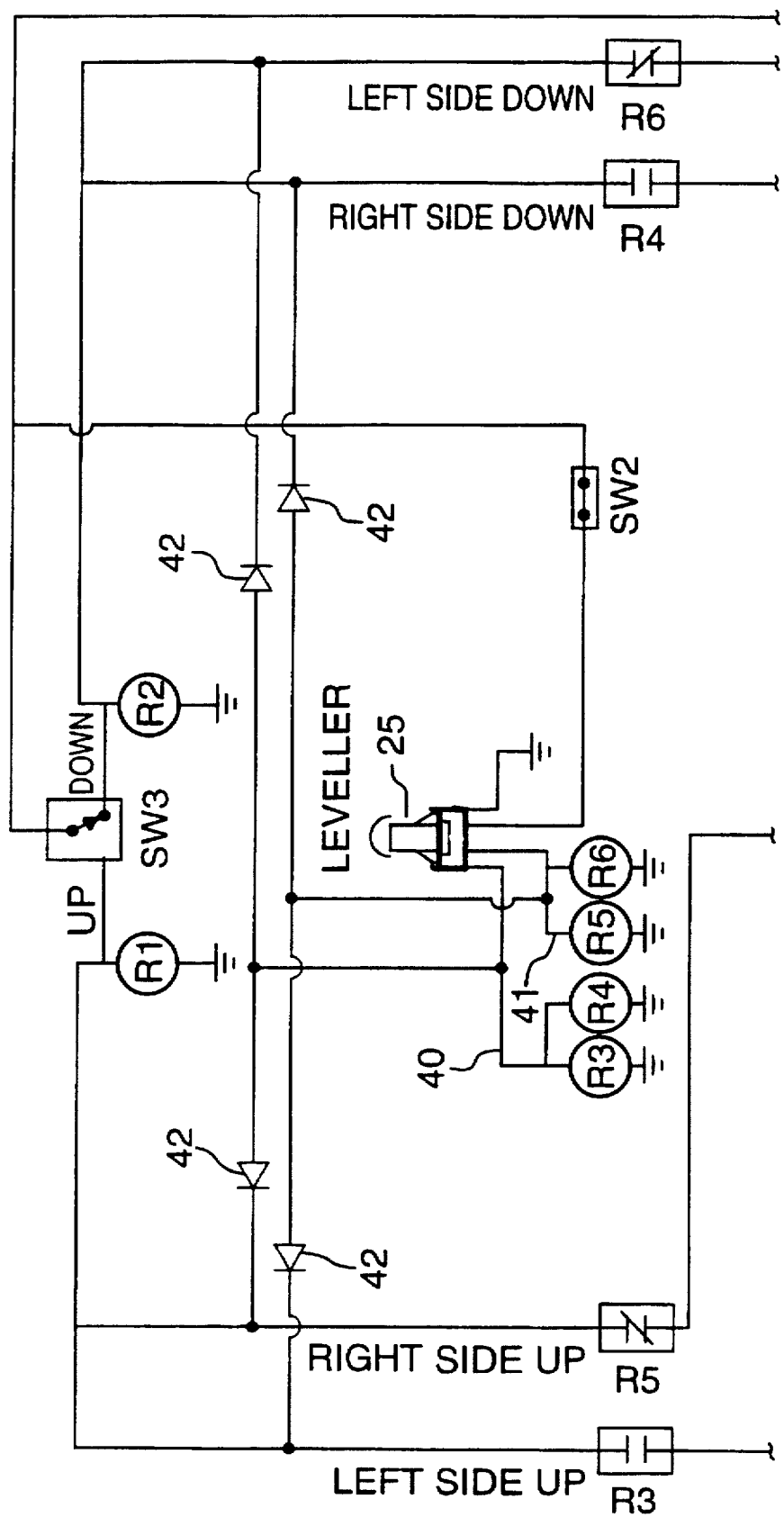
FIG. 8 is a schematic diagram of the integrated hydraulic and electrical system for the tandem system (second) embodiment of the present invention, which allows more rapid levelling of the platform; the platform lift being shown operated in the "up" position, with the platform being in a "right side high" configuration, and the right side switch valve and associated control valve being switched so as to move the right side of the platform downward while the other left side is being raised so as to correct such non-level condition.
Figure 8B:
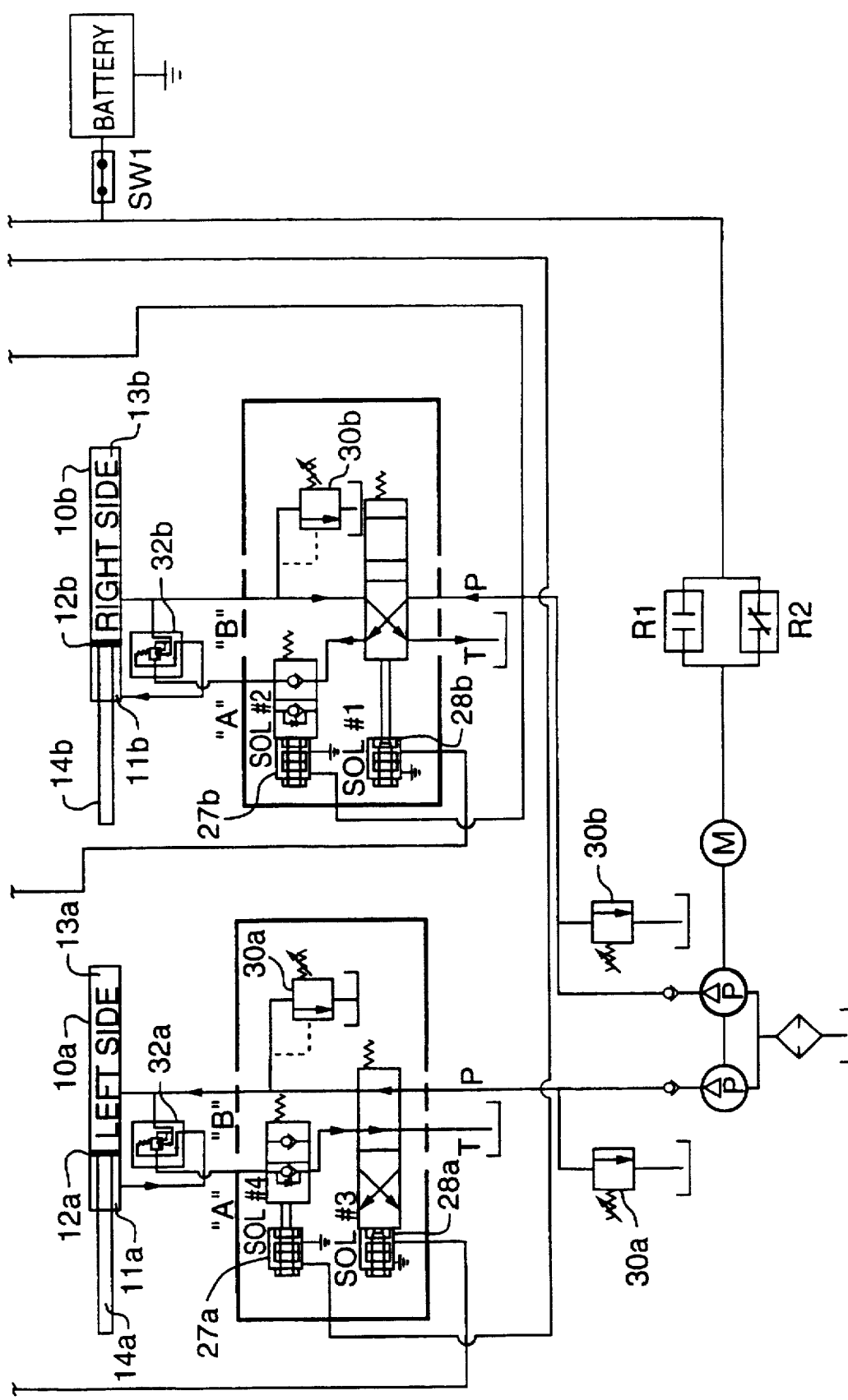
Figure 9A:
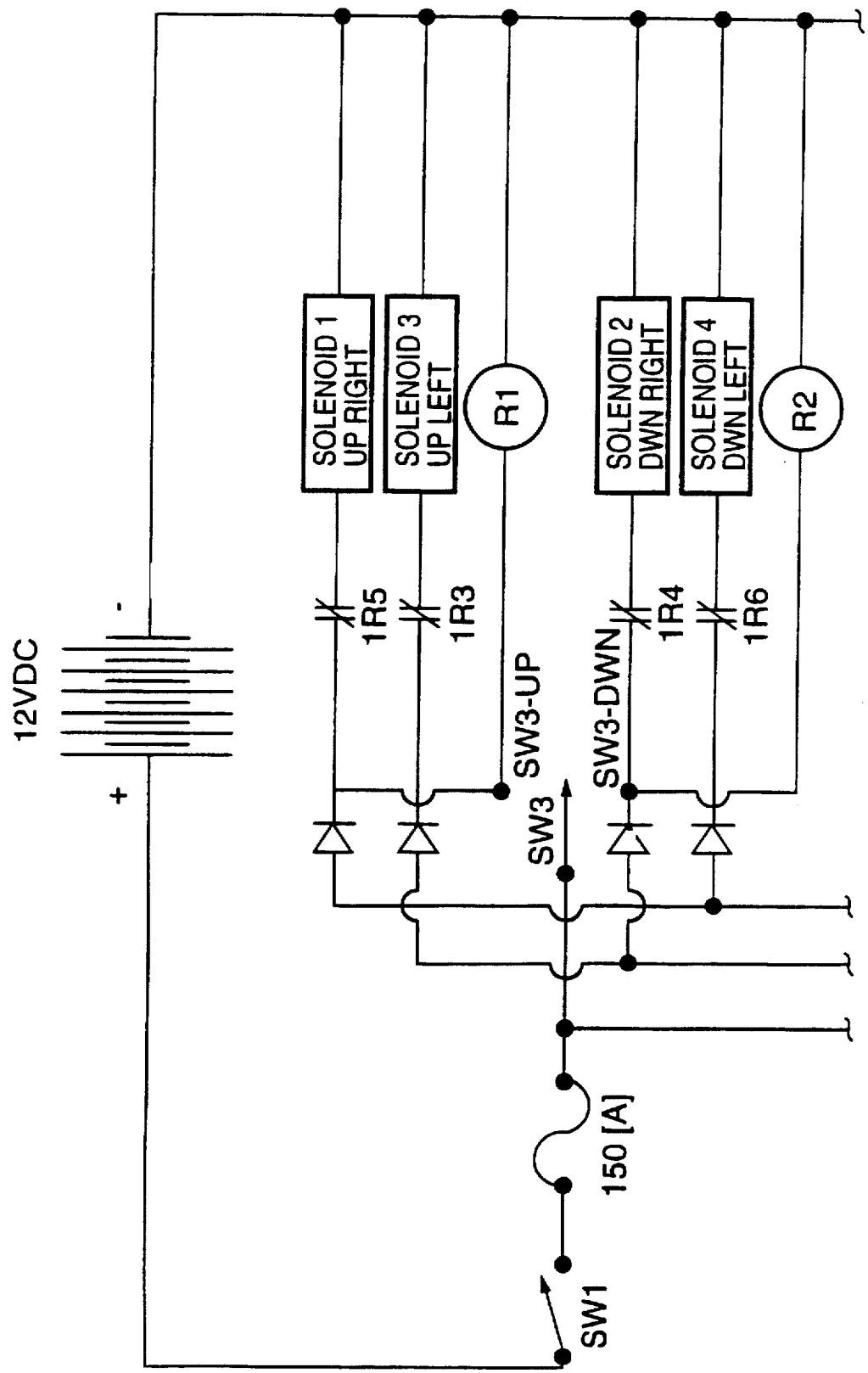
FIG. 9 is a detailed schematic diagram of the electrical system for the tandem system (second embodiment) shown in FIG. 8.
Figure 9B:
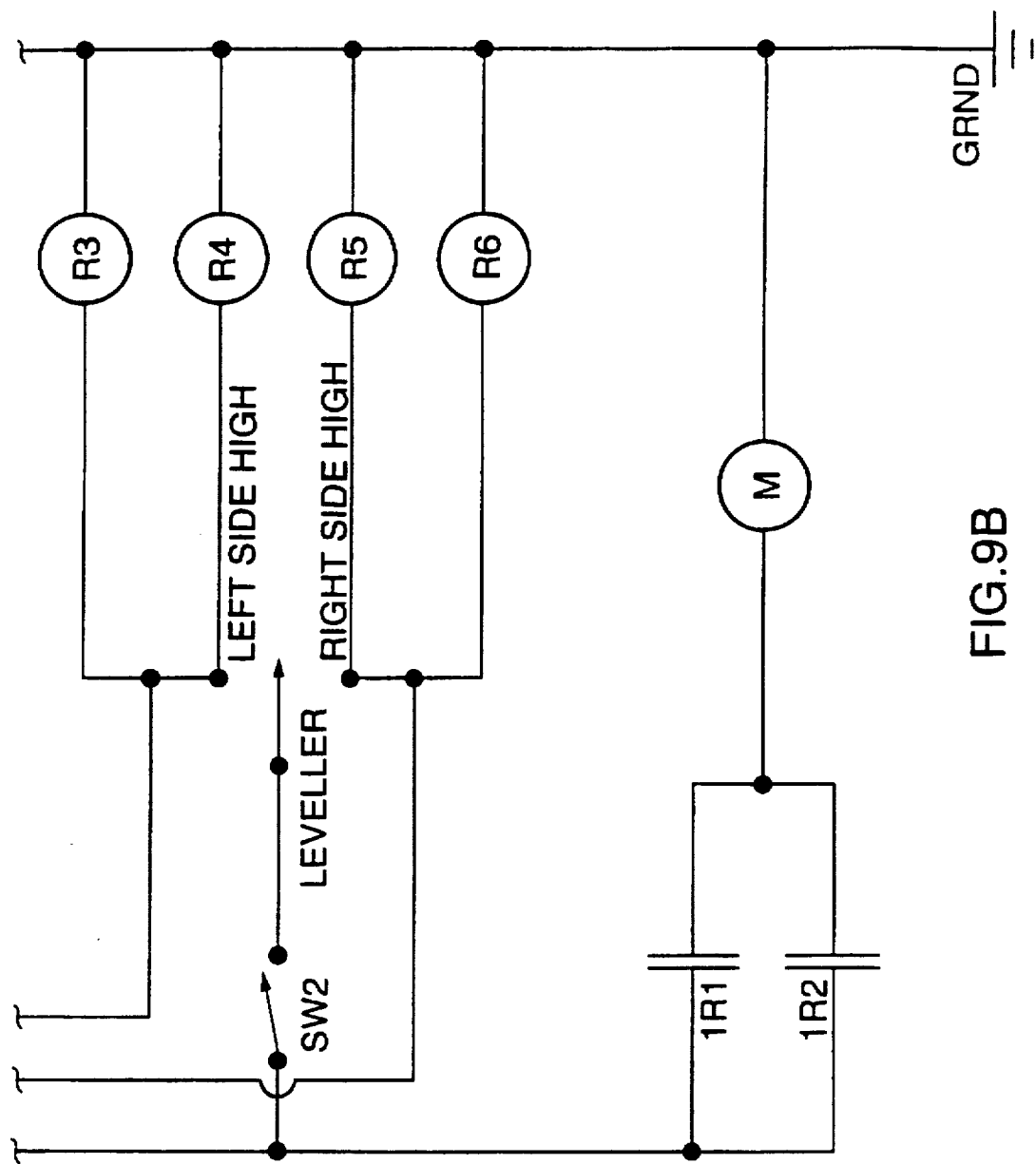

In a second preferred embodiment of the present invention, shown schematically in FIGS. 8 & 9, the particular circuitry employed in the first embodiment is modified and is particularly adapted so as to provide rapid levelling of the platform during raising or lowering. In this embodiment rather than levelling the platform by stopping movement of a particular side of the platform and allowing the other side of the platform to "catch up", in a situation where the platform is switched to the "up" position and one particular side 16a,b of the platform is higher than the other, advantageously such particular side 16a,b is reversed in its motion, namely it is caused to move downwards, while the opposite side is permitted to move upwards, thereby bringing the platform 4 more rapidly into a level. Conversely, when the platform 4 is in the "down" position and is being lowered, and one particular side, for example left side 16a, is lower than the other side 16b, such lower side 16a will be reversed in its downward motion, and caused to move upwardly so as to become level with downwardly moving side 16b. Upon a level condition of the platform 4 being obtained, both sides 16a,b will continue to move downwardly.

The further refinements to the first embodiment which are present in the second embodiment which allow it to accomplish rapid levelling are shown in FIGS. 8 & 9. In particular, FIG. 9 shows the modifications to the electrical circuitry necessary to accomplish such desired result, wherein additional electrical connections are made between leads 40 and 41 to switch valve 28b and control valve 27a, and switch valve 28a and control valve 27b, respectively. Diodes 42 are necessary to prevent by-pass of the leveller 25 and inadvertent supply of current to $R_3$ $R_4$, $R_5$, or $R_6$. By way of an example of such second embodiment in operation, FIG. 8 shows the hydraulic circuitry where the platform 4 is being operated in the "down" position, with relay $R_2$ being energized, and with correction being made to correct a left side high/right side low condition of the platform 4. In such situation leveller 25 provides electrical current to lead 40 thereby opening relays $R_3$ and $R_4$ and thereby de-energizing flow valve 27b (sol. #2) and switch valve 28a (sol. #3). Electrical current continues to flow to control valve 27a (sol. #4), thereby allowing the left side 16a of the platform 4 to continue to be driven downwards. Advantageously, lead 40 also supplies current to switch valve 28b (sol. #1), via relay $R_5$ which i in a closed state, thereby causing the right side cylinder 10b to drive the right side 16b of the platform upwards until a level condition is reached, wherein both sides 16a,b will continue to be driven downwardly.

The addition and operation of a manual override feature to the first and second embodiments will now be described and explained.

Figure 10A:
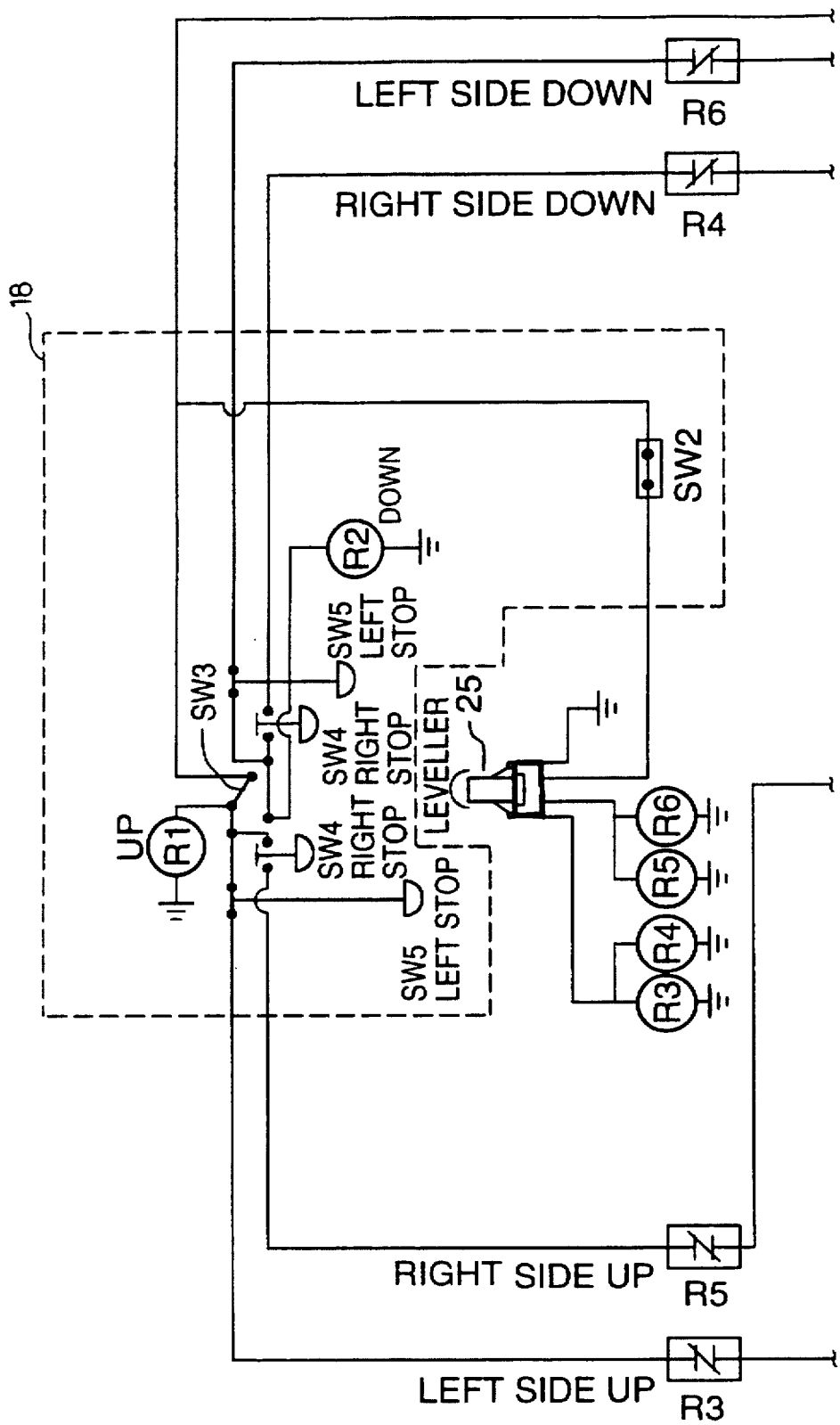
FIG. 10 is a schematic diagram of the integrated hydraulic and electrical system for the tandem system (first) embodiment of the present invention, adding a further refinement to the first embodiment shown in FIGS. 3–6, namely manual switches for providing manual override and control to allow manual levelling of the platform, where the platform is being operated in the "up" position, and the platform being in a "right side high" configuration and the right side piston being manually held stationary to correct such non-level condition.
Figure 10B:
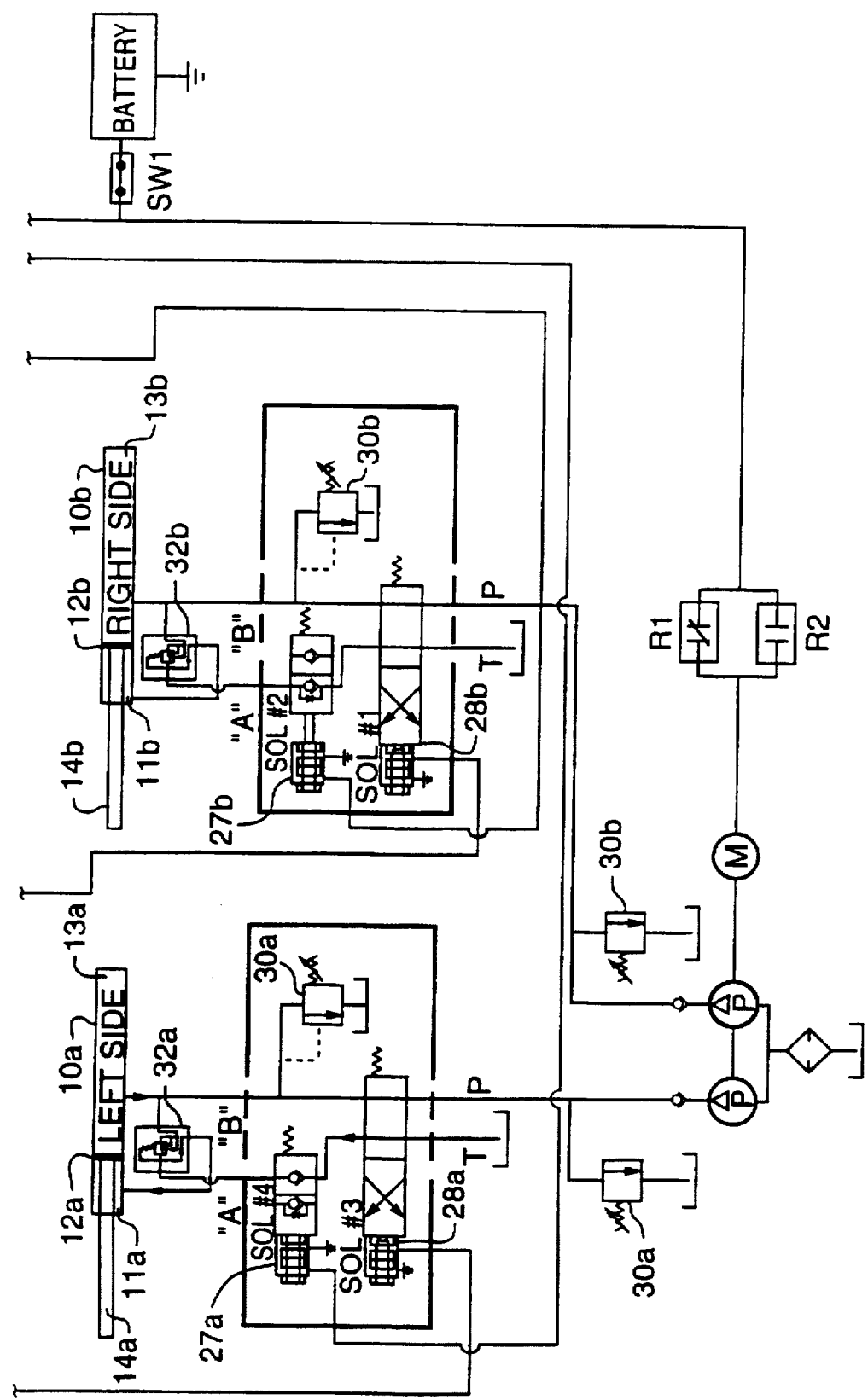
Figure 11A:
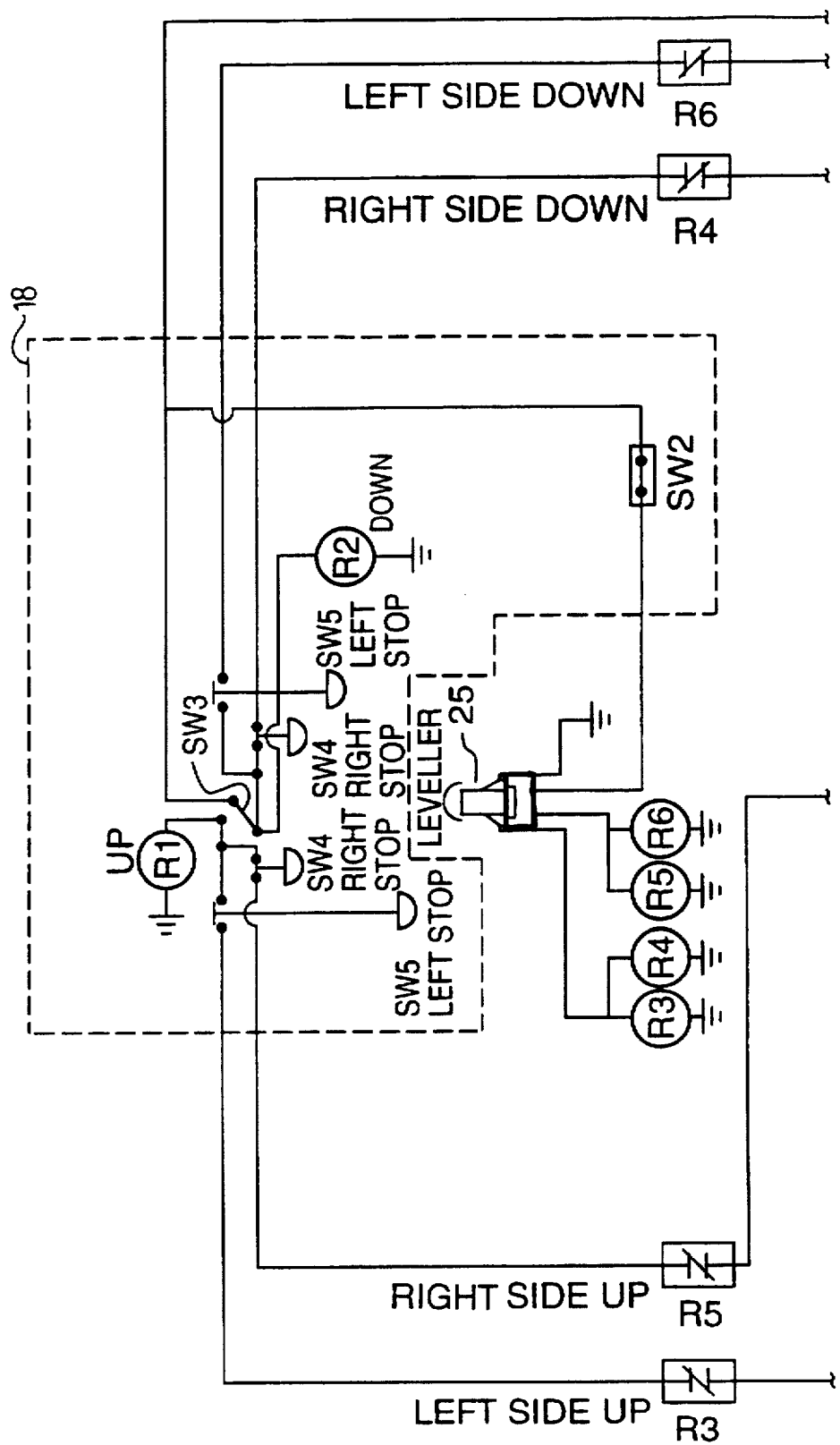
FIG. 11 is the schematic diagram of integrated hydraulic and electrical system shown in FIG. 10, where the platform is being operated in the "down" position, with the platform being in a "right side high" configuration and the left side piston manually being held stationary to correct such non-level condition.
Figure 11B:
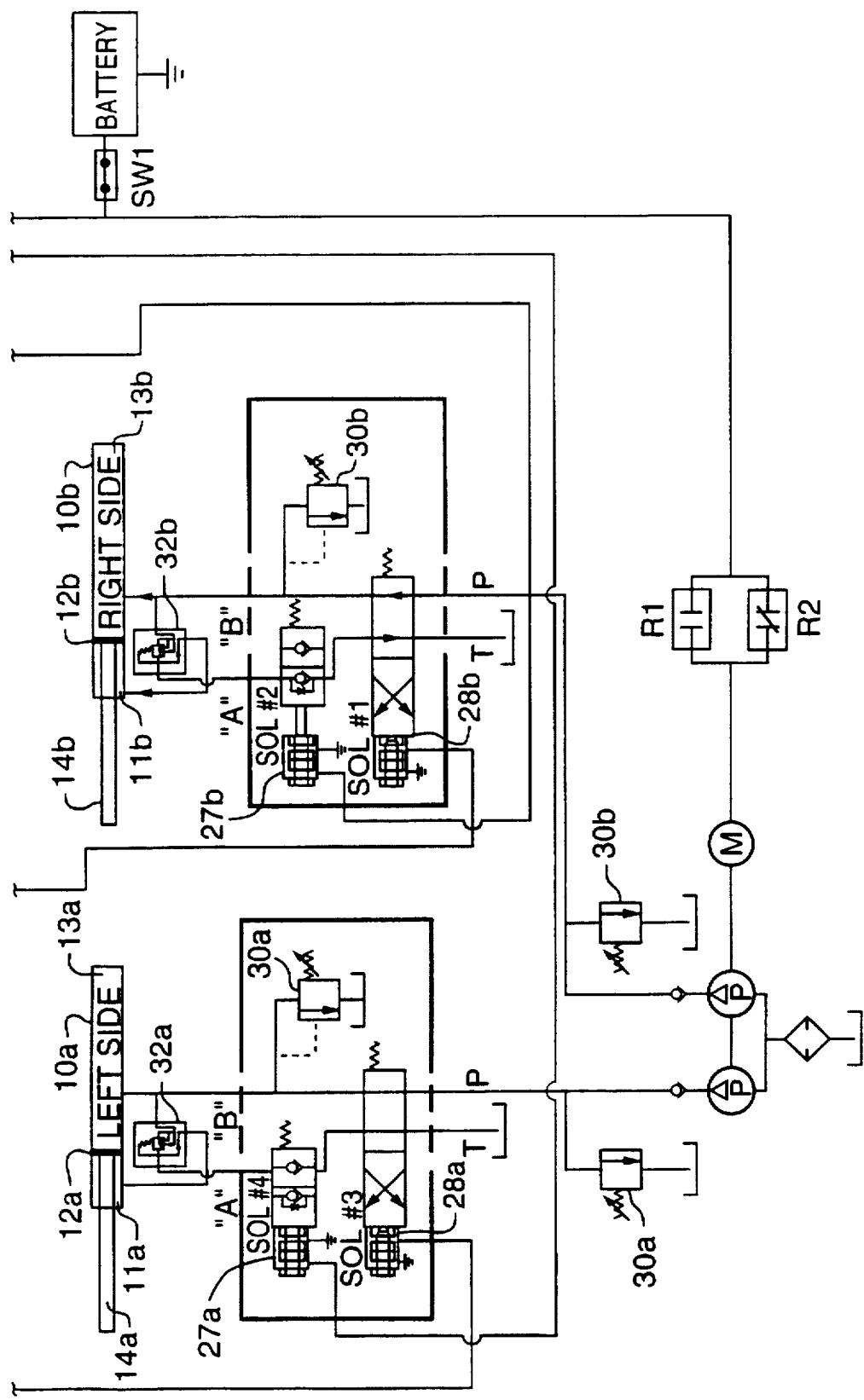
Figure 12A:
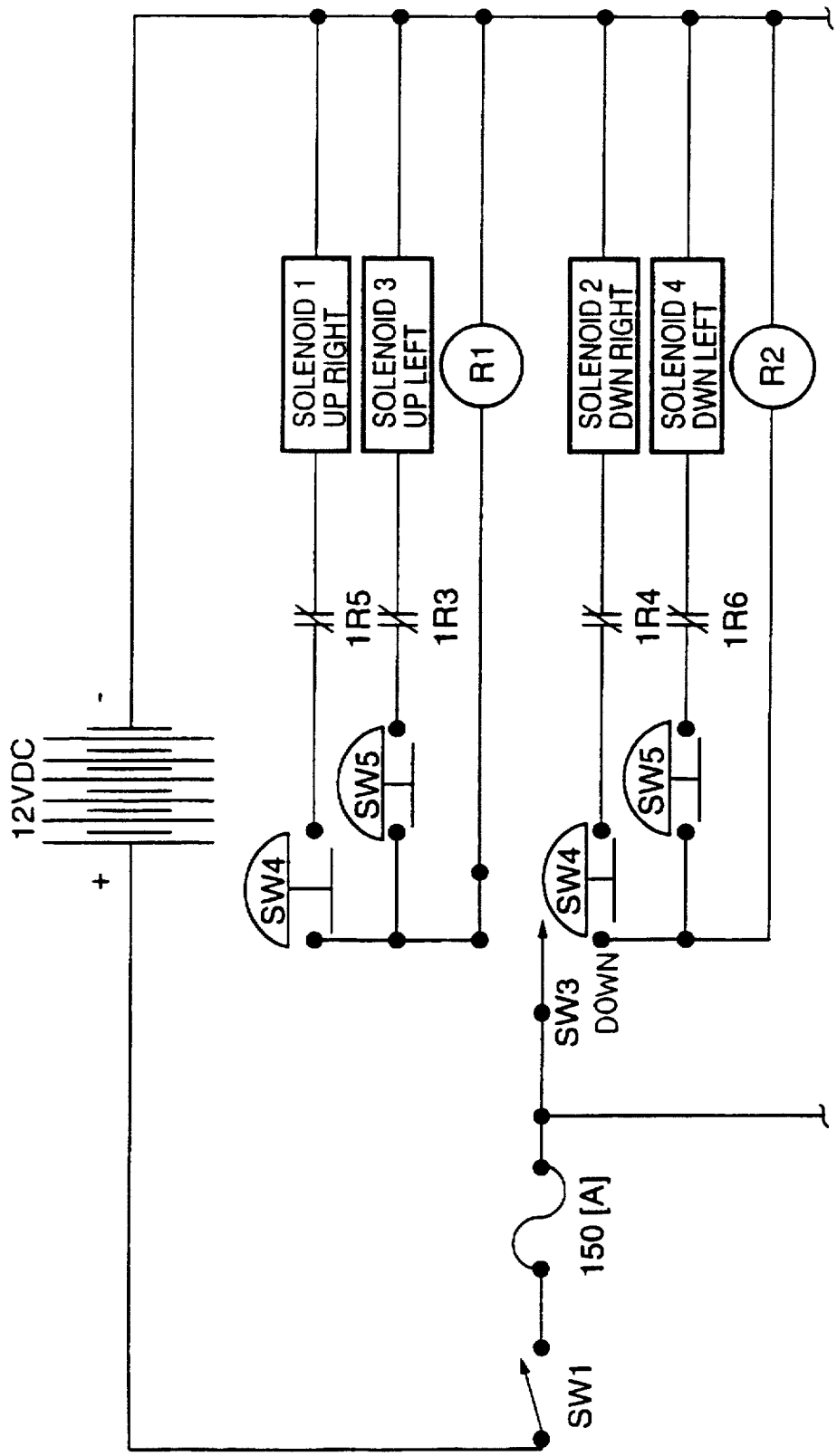
FIG. 12 is a detailed general schematic diagram of the electrical system for the tandem (first) embodiment shown in FIGS. 10 & 11, incorporating the manual override and switching feature.
Figure 12B:
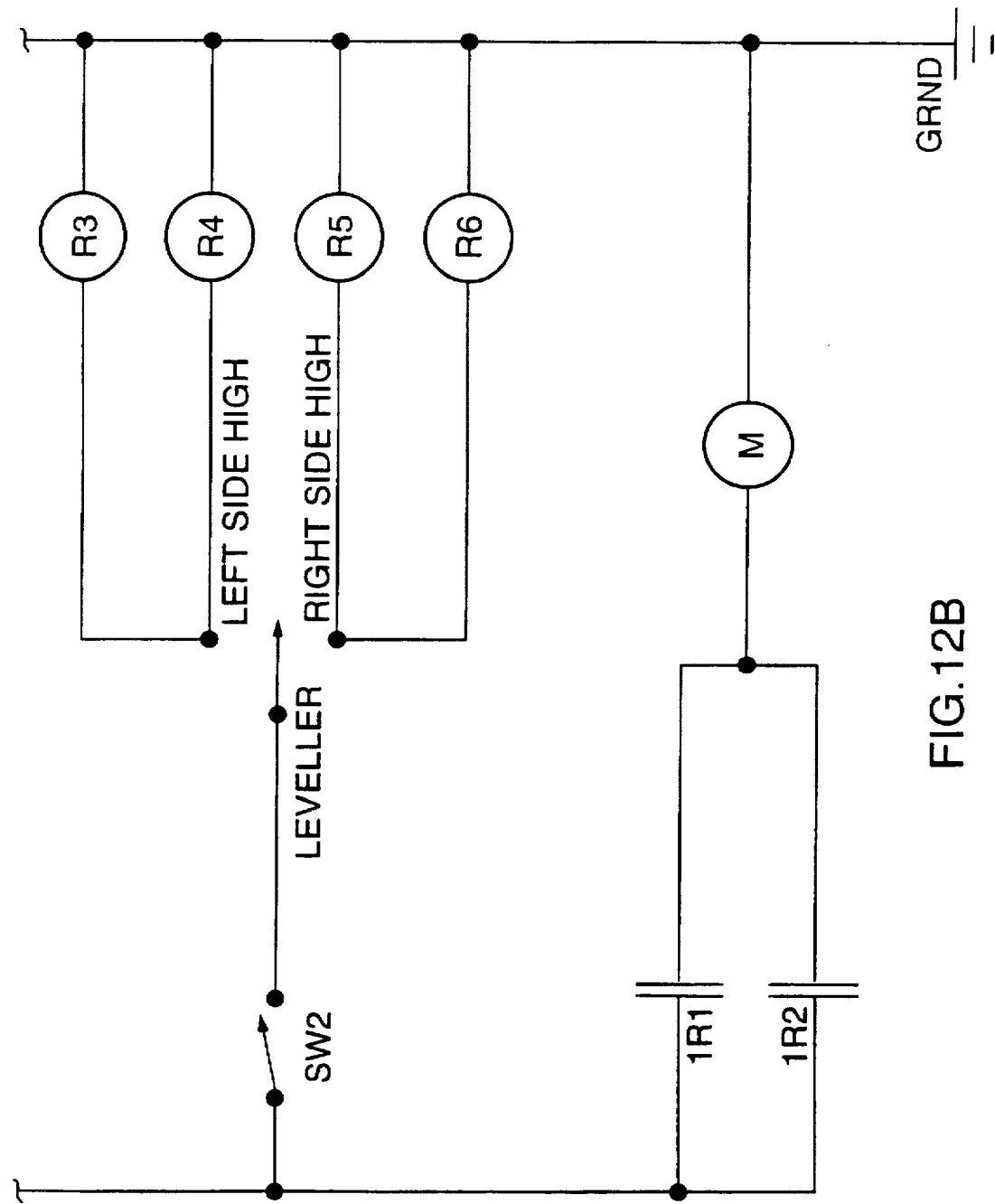

FIGS. 10–12 show the addition of manual switches SW4 and SW5 needed to be added to allow selective manual cutting of electrical power to control valve 27b (sol. #2) and switch valve 28b (sol. #1), and control valve 27a (sol. #4) and switch valve 28a (sol. #3), respectively, to thereby allow manual levelling.

The control box 18, shown in FIG. 2b and in phantom in FIGS. 10 & 11, necessary to accomplish the manual override and switching, contains switches SW2, SW4, and SW5.

FIGS. 10 & 11 give examples of the operation of the manual override and switching feature. FIG. 10 shows the operation of this manual switching feature in a situation where the platform 4 is being operation in an "up" position, and manual switching is used to control a "right side high condition". Manual switch SW2 is opened to disable leveller 25, and manual switch SW4 (Right Stop) is depressed. Such causes each of switch valve 27b (sol. #2) and switch valve 28B (sol. #1) to be de-energized, thus stopping movement of the right side 16b, and leaving switch valve 28a (sol. #3) energized, allowing the left side 16a to "catch up". FIG. 11 is an example of manual operation, with the lift 2 being operated in the "down" position, with SW5 (Left Stop) being depressed to correct a "left side low", thereby stopping movement of left side 16a of the platform 4, and allowing continued downward movement of the right side 16b to allow the right side 16b to "catch up". FIG. 12 is a detailed general schematic diagram of the electrical wiring to allow such operation, showing the location of manual switches SW4 and SW5.

The addition of manual switches SW4 and SW5 as a manual adjustment can also be easily and quickly added as a feature to the second embodiment of the invention, whereby depressing the manual switches SW4 (right) or SW5 (left) will not simply stop the affected left or right side 16a,b of the platform, but will cause, in the case of depressing SW4, a clockwise correction (right side down—left side up) regardless of whether the lift 2 is being operated in the "up" or the "down" position. Likewise, in the case of manually depressing SW5, such will cause a counter clockwise rotation of the platform (right side up—left side down) regardless of whether lift 2 is being operated in the "up" or "down" position.

Figure 13A:
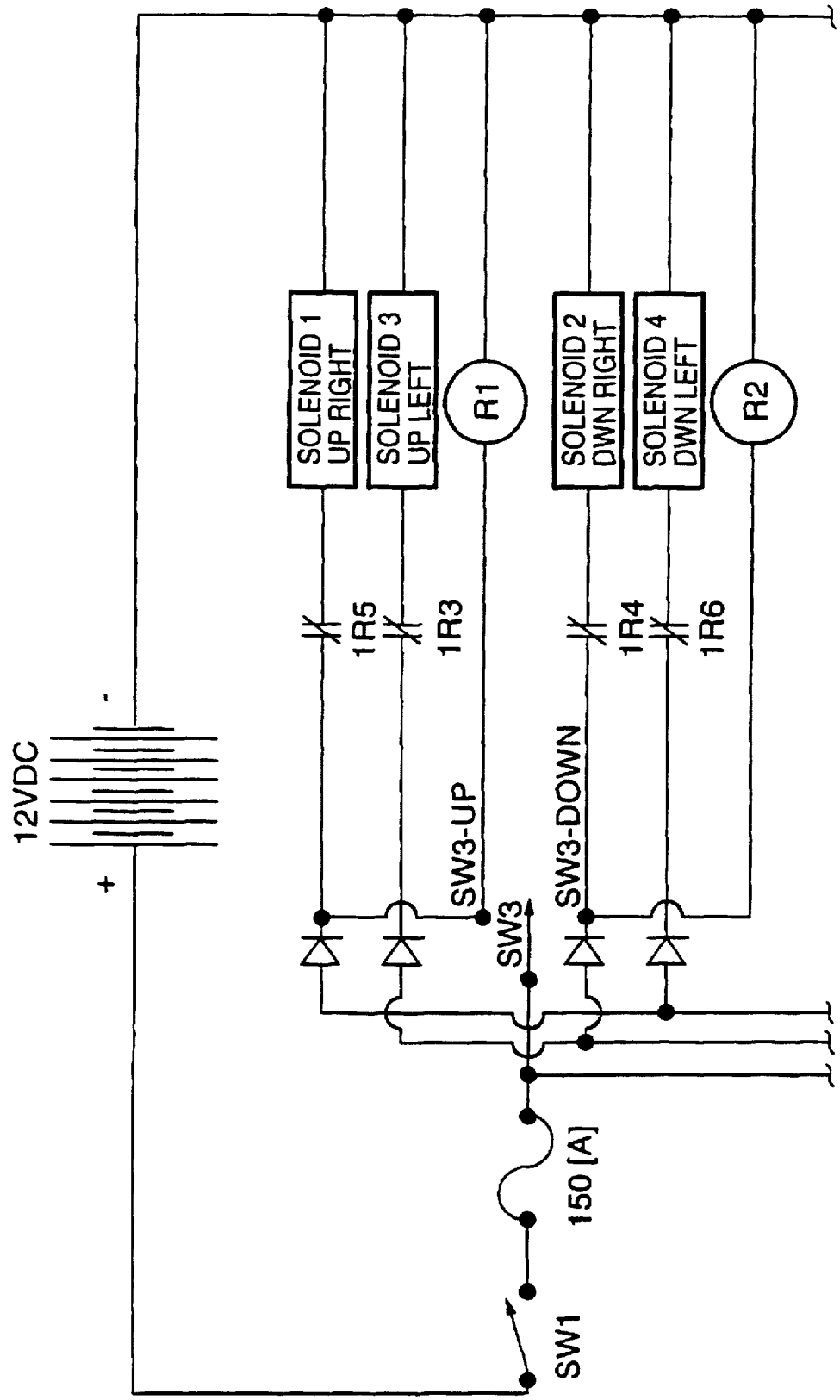
FIG. 13 is a detailed general schematic diagram of the electrical system for the tandem system (second) embodiment shown in FIG. 9, further incorporating manual switches for providing manual override and control to allow manual levelling of the platform.
Figure 13B:
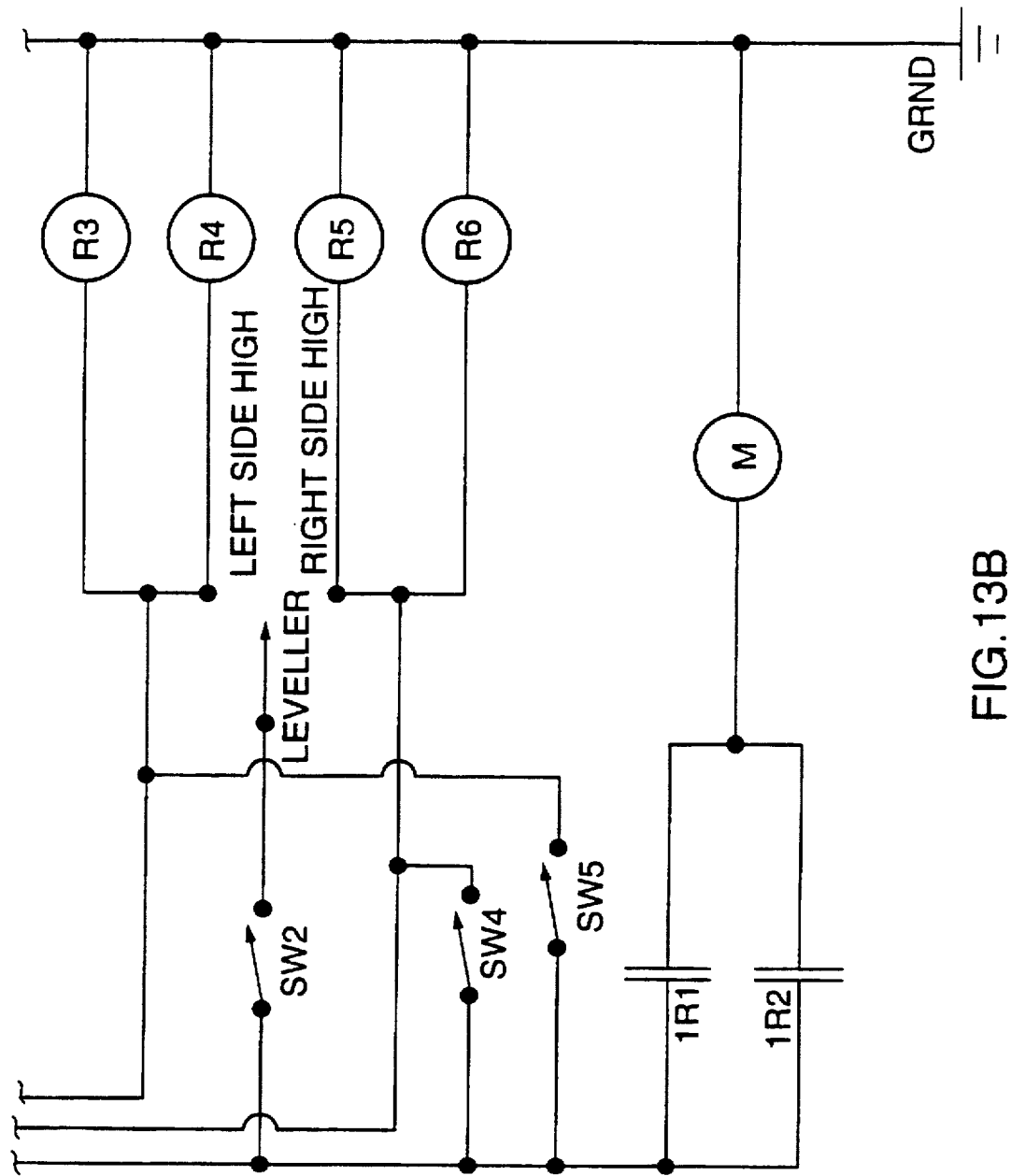

The simple modification to the electrical circuitry of the second embodiment shown in FIG. 9 to add manual switches SW4 and SW5 to add the additional manual adjust feature is shown in FIG. 13.

Figure 14A:
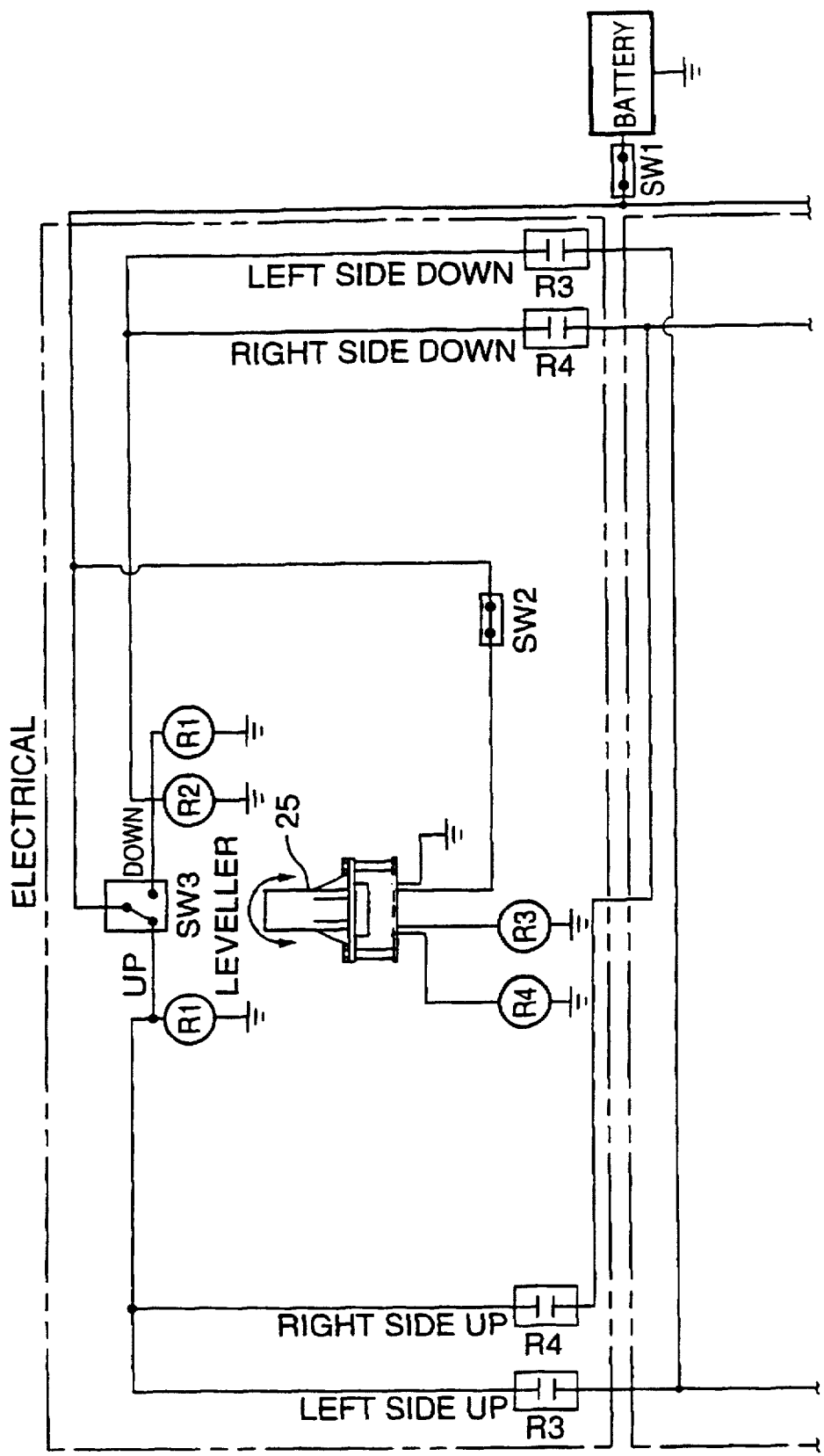
FIG. 14 is a schematic diagram of the integrated electrical and hydraulic system for the single pump (third) embodiment of the present invention, showing the platform lift being operated in the "up" position, with both sides of the platform and the respective pistons being driven upward.
Figure 14B:
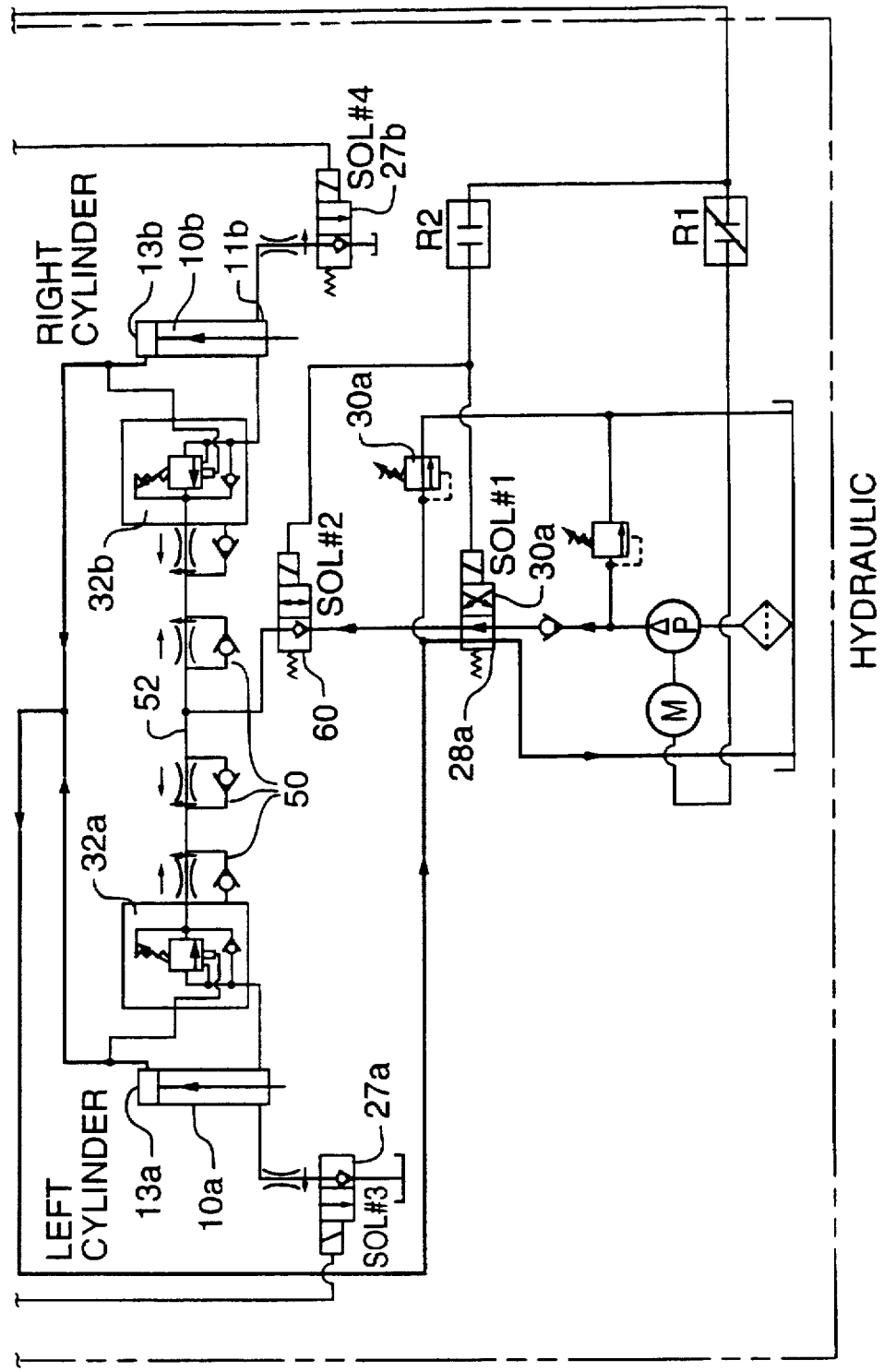

The hydraulic and electrical configuration to allow operation of the leveller 25 for the single pump configuration (third embodiment) is shown in FIG. 14.

Figure 15B:
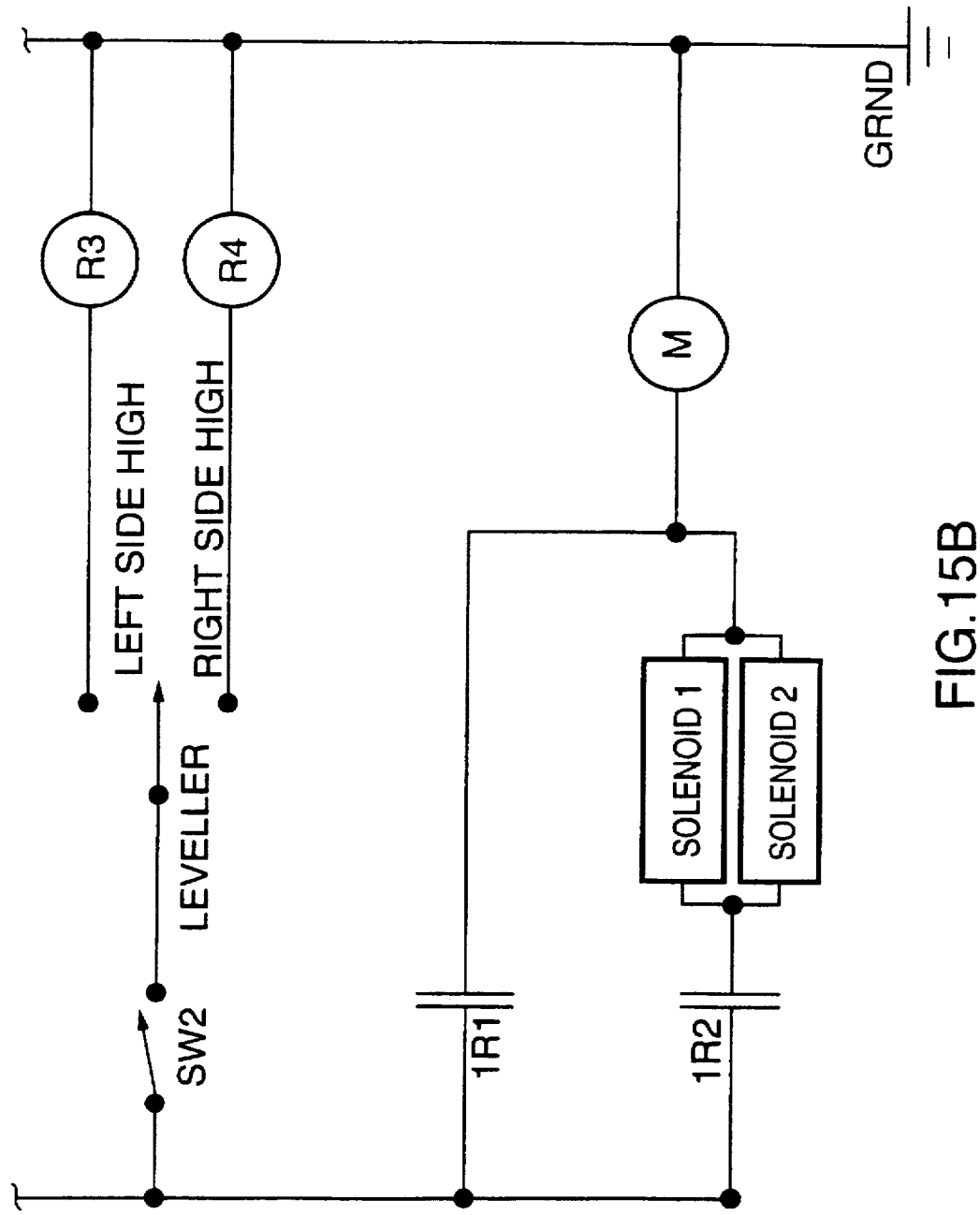
FIG. 15 is a detailed electrical schematic diagram for the single pump (third) embodiment of the present invention, shown in FIG. 14.

In such configuration, in the event the left side 16a or right side 16b of the platform is high during raising of the platform 4, then the leveller 25 closes the appropriate relay R₃ or R₄ so as to cause the corresponding flow control valve 27a or 27b to open, thus dumping pressurized hydraulic fluid being supplied to the corresponding cylinder 10a,b back to the tank "T", and causing such cylinder 10a,b to then be raised slower than the other, and allowing the other cylinder 10b,a to "catch up" and thus level the platform 4. As may be seen from FIG. 14, a number of ventures 50 are placed in the conduit 52 connecting the two cylinders 10a,b to act as a flow restriction so that simply opening one control valve 27a,b does not cause both cylinders to slow in their rate of ascent. Likewise, for levelling the platform 4 during lowering thereof, in the event one side 16a,b of the platform 4 is higher than the other, then leveller 25 opens the appropriate relay R₃, R₄, and hydraulic fluid is dumped by the appropriate control valve 27a,b to tank "T", thus increasing the rate of descent of the higher sides 16a,b, allowing it to "catch up" to the other side. A further flow limiting valve 60 may be added as a safety feature to prevent further descent of other side of the platform in the event of loss of hydraulic pressure downstream. FIG. 15 shows a detailed electrical wiring schematic of the connections between the leveller 25 and the various relays R₃ & R₄, and switch valve 27a,b (sol. #3 & #4).

Figure 16A:
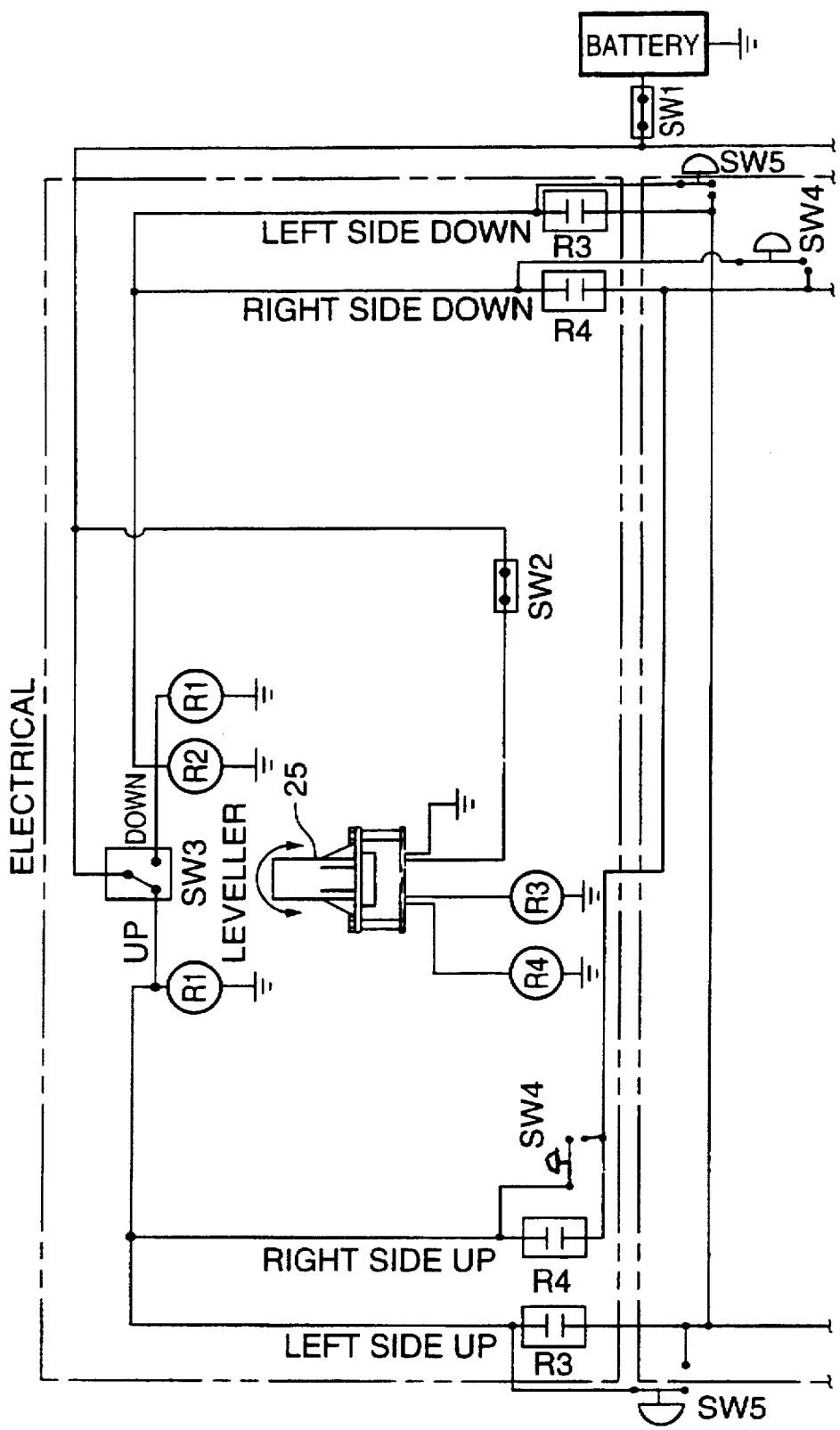
FIG. 16 is a schematic diagram of the integrated electrical and hydraulic system for the single pump (third) embodiment of the present invention, further possessing manual switches for providing manual override and control to allow manual levelling of the platform.
Figure 16B:
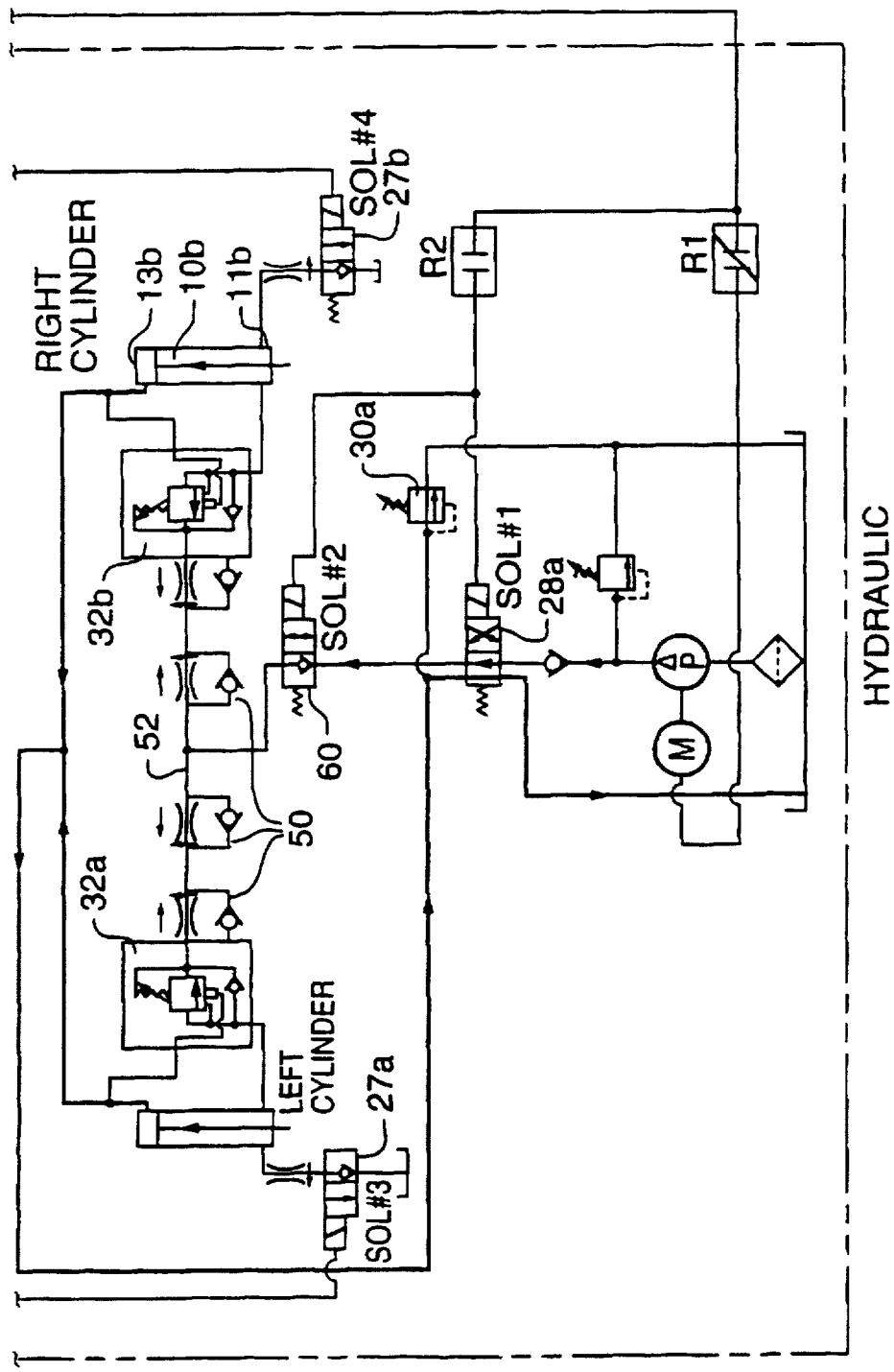
Figure 17A:
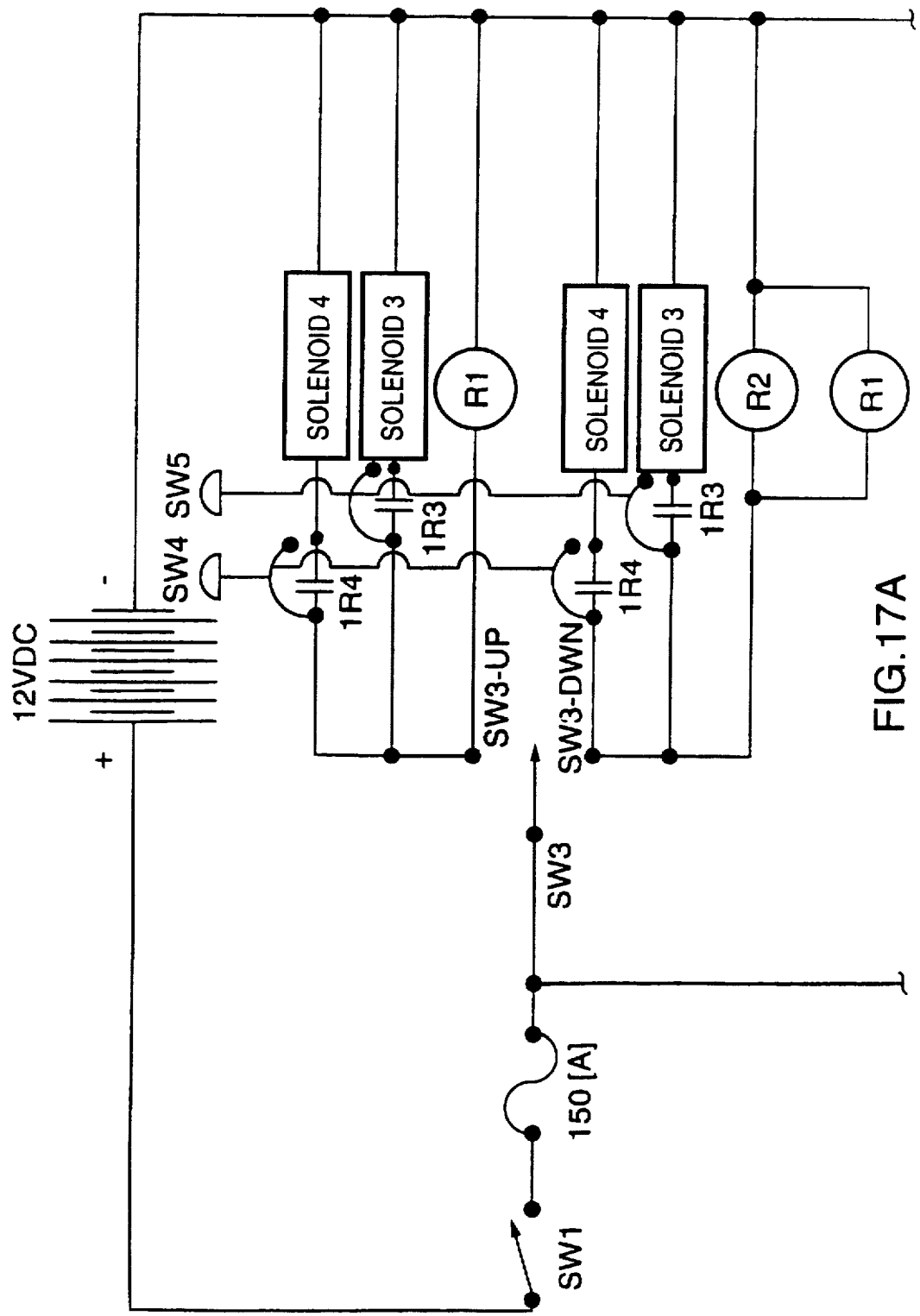
FIG. 17 is a detailed electrical schematic diagram for the single pump (third) embodiment of the present invention shown in FIG. 16.
Figure 17B:
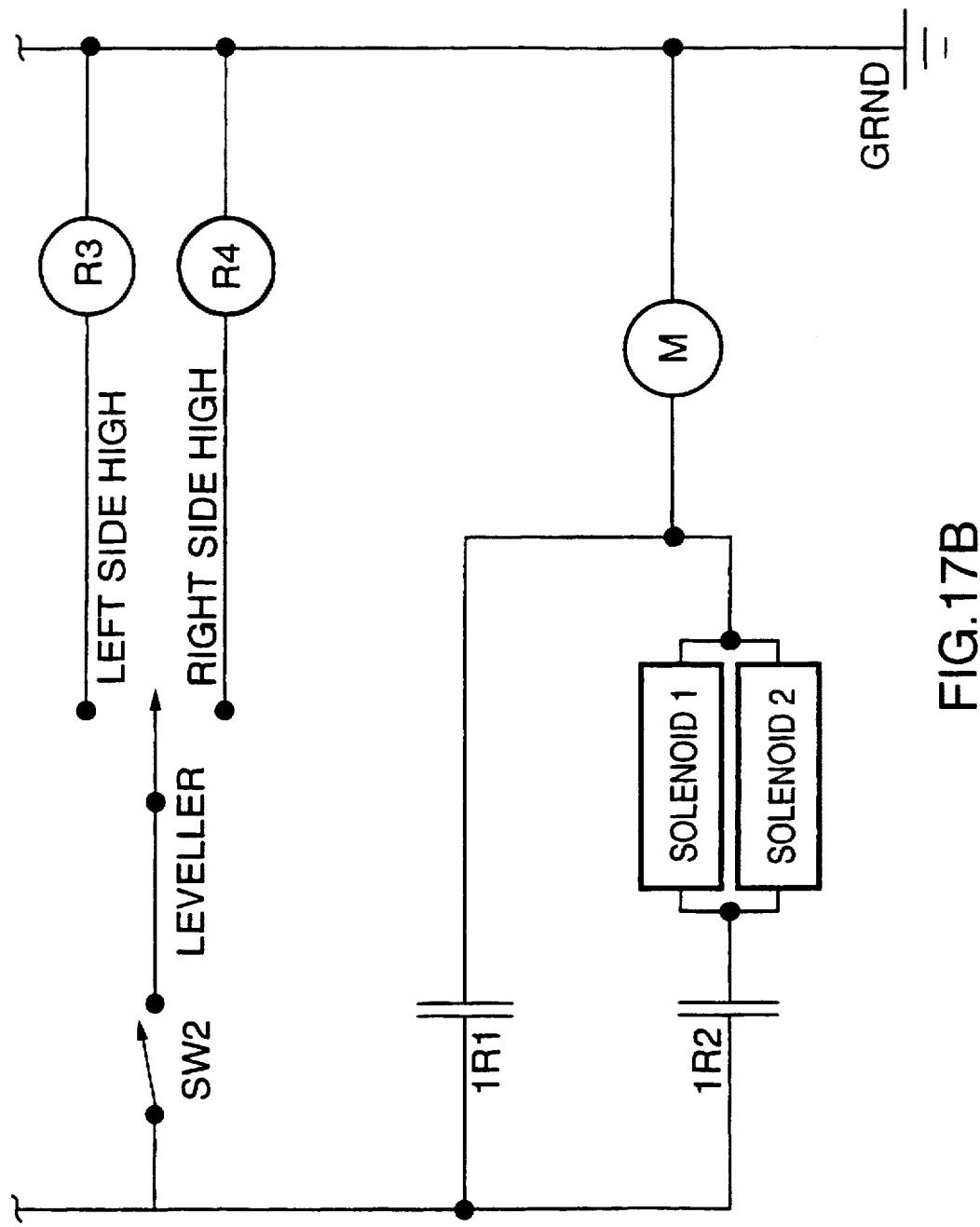

FIG. 16 shows the third embodiment with the additional feature of providing manual override and control switches SW4 and SW5 to allow manual levelling of the platform 4. Depressing SW4 causes the right side 16b to be lowered, and depressing SW5 causes the left side 16a to be lowered. Advantageously, to implement manual adjustment the leveller 25 in this configuration need not be disabled as is necessary in the first and second embodiments utilizing manual switching, since switches SW4 and SW5 in this configuration automatically override leveller 25 without having to disable the leveller 25 by opening SW2. FIG. 17 shows a detailed electrical schematic for the incorporation of the manual override and switching feature (SW4 and SW5).

Although the disclosure describes and illustrates the preferred embodiments of the invention, it is understood that the invention is not limited to these particular embodiments. Many variations and modifications will now occur to those skilled in the art. For definition of the invention, reference is made to the appended claims.

I claim:

1. A hydraulic platform lift for use in raising and lowering a platform for loading cargo into, and for unloading said cargo from, a cargo storage area of a truck or truck trailer, comprising:

a) a pair of vertically-mounted, dual acting, hydraulic cylinders, each having pistons, each utilizing hydraulic fluid applied at a lower end thereof and at an upper end thereof to raise and lower, respectively representative opposite sides of said platform;

b) first conduit means in communication with said lower end of each of said hydraulic cylinders to allow passage of hydraulic fluid to and from said lower end of said cylinders;

c) second conduit means in communication with said upper end of each of said cylinders;

d) pump means for supplying hydraulic fluid under pressure;

e) a hydraulic fluid reservoir;

f) electrically activated valve switching means to allow switching of supply of hydraulic fluid from a first position whereby hydraulic fluid is supplied by said pump means to said lower end of said cylinders via said first conduit means and simultaneously allowed to return to said reservoir via said second conduit means and a second position whereby hydraulic fluid is supplied to said upper end of said cylinders via said second conduit means and simultaneously allowed to return to said reservoir via said first conduit means;

g) left and right electrically-activated flow control valves for controlling flow of hydraulic fluid exiting from the lower end of an associated cylinder, each independently switchable when said electrically-activated valve switching means is in said second position, from a first position allowing egress of hydraulic fluid from the lower end of the associated cylinder to a second position preventing egress of hydraulic fluid from said lower end of the associated cylinder; and h) automatic level control means, comprising:

i) means for detecting the non-levelness of the platform during lowering of the platform and selecting which of said left and right flow control valves need be switched to return the platform to a level condition; and ii) means for switching said selected one of said left and right flow control valves when a non-level condition of the platform is detected so as to cause said selected one of said flow control valves to switch position to thereby change the flow of hydraulic fluid exiting from the lower end of the associated cylinder in relation to that exiting from the lower end of the other of said cylinders and thereby change the rate of lowering of said cylinder relative to the other of said cylinders so as to adjust the platform to a level condition.

2. The hydraulic platform lift as claimed in claim 1, said means for switching said selected one of said flow control valves adapted, when a non-level condition of the platform is detected during lowering of the platform, to de-activate said selected one of said left and right flow control valves so as to cause said selected flow control valve to switch from a first position allowing egress of hydraulic fluid from the lower end of an associated cylinder to a second position preventing egress of hydraulic fluid therefrom, thereby preventing an associated side of the platform to which the associated piston is coupled from moving and allowing said other of said pair of cylinders to continue to lower an opposite side of the platform thereby bringing the platform to a level condition.

3. The hydraulic platform lift as claimed in claim 1, said means for switching said selected one of said flow control valves adapted, when a non-level condition of the platform is detected during lowering of the platform, to activate said selected one of said left and right flow control valves during the lowering of said platform so as to cause said selected control valve to switch from a first position preventing egress of hydraulic fluid from the lower end of an associated cylinder to a second position allowing egress of hydraulic fluid from the lower end of the associated cylinder to allow an increased rate of lowering of an opposite side of the platform relative to the rate of lowering of an associated side of the platform to thereby bring the platform to a level condition.

4. The hydraulic platform lift as claimed as in claim 1,
   said flow control valves in said first position allowing egress of hydraulic fluid from the lower end of an associated cylinder but preventing supply of hydraulic fluid to said lower end, and in said second position preventing egress of hydraulic fluid from said lower end but allowing supply of hydraulic fluid to said lower end;
   said electrically-activated valve switching means comprising a pair of left and right electrically activated switching valves, each left and right switching valve associated with a respective control valve piston and cylinder;
   said automatic control means adapted, when a non-level condition arises during the lowering of the platform, to cause a selected one of said left and right flow control valves to switch from said first position to said second position, and to further cause an associated switching valve to switch from said second position to said first position to thereby cause the associated piston to raise the associated side of the platform.

5. The hydraulic platform lift as claimed in claim 1, further comprising:
   means for disengaging said automatic level control means in the event of failure thereof; and
   manually-operated electrical switch means for switching a selected one of said left and right flow control valves during at least the lowering of the platform so as to cause said selected one of said flow control valves to switch position and thereby change the flow of hydraulic fluid exiting from said lower end of said associated cylinder relative to the flow of hydraulic fluid exiting from the lower end of said other of said cylinders.

6. The hydraulic platform lift as claimed in claim 5, said manually-operated electrical switch means adapted, during the lowering of the platform, to cause said selected one of said flow control valves to switch from a first position allowing egress of hydraulic fluid from the lower end of an associated cylinder to a second position preventing egress, thereby preventing said cylinder from continuing to lower the platform and allowing said other of said pair of cylinders to continue to lower thereby bringing the platform to a level condition.

7. The hydraulic platform lift as claimed in claim 5, said manually-operated electrical switch means adapted, during the lowering of said platform so as to cause said desired one of said left and right control valves to switch from a first position preventing egress of hydraulic fluid from the lower end of an associated cylinder, to a second position allowing egress of hydraulic fluid from the lower end of said associated cylinder, to allow an increased rate of lowering of the associated cylinder to thereby bring the platform to a level condition.

8. The hydraulic platform lift as claimed in claim 2, wherein said electrically-activated valve switching means comprises a pair of solenoid-operated switching valves, each valve associated with a respective cylinder.

9. The hydraulic platform lift as claimed in claim 8, wherein each of said flow control valves is in fluid communication with and controls passage of hydraulic fluid through said first conduit means.

10. The hydraulic platform lift as claimed in claim 1, wherein said pump means comprises a pair of positive-displacement pumps, each pump adapted to independently supply hydraulic fluid under pressure to an associated cylinder, each of said associated cylinder and pump thereby forming two independent hydraulic circuits.

11. A vehicle-mounted hydraulic platform lift for use in raising and lowering a platform for loading cargo into, and unloading said cargo from, a cargo storage area of a truck or truck trailer, comprising:

a) left and right vertically-mounted, dual-acting hydraulic cylinders which each utilize hydraulic fluid supplied at a lower end and upper end thereof to raise and lower, respectively, the platform;

b) each cylinder having
      i) a first conduit in communication with said lower end thereof to allow passage of hydraulic fluid to and from said lower end of said cylinder; and
      ii) a second conduit in communication with said upper end thereof;

c) pump means for supplying hydraulic fluid under pressure to said cylinders;

d) a hydraulic fluid reservoir;

e) left and right electrically-activated switch valves associated with a respective left and right cylinder, to allow switching of hydraulic fluid from a first position whereby hydraulic fluid is supplied by said pump means to said lower of said cylinder via said first conduit and simultaneously allowed to return to said reservoir from said cylinder via said second conduit to thereby raise an associated side of the platform, and a second position whereby hydraulic fluid is supplied to said upper end of said cylinders via said second conduit and simultaneously allowed to return to said reservoir via said first conduit to thereby lower the associated side of the platform;

f) left and right electrically-activated flow control valves, associated with a respective left and right cylinder, in fluid communication with said first conduit, for controlling flow of hydraulic fluid into or out of the lower end of a respective cylinder via said first conduit;

g) each of said left and right flow control valves independently switchable when the respective switch valve is in said second position and said platform is being lowered, from a first position allowing egress of hydraulic fluid via said first conduit from the lower end of an associated cylinder to a second position preventing egress of hydraulic fluid therefrom, and when the respective switch valve is in said first position and said platform is being raised, from a second position allowing entry of hydraulic fluid via said first conduit into the lower end of an associated cylinder, to a first position preventing entry of hydraulic fluid into the lower end of said associated hydraulic cylinder;

h) automatic level control means, comprising:
      i) means for detecting the non-levelness of the platform during raising or lowering of the platform and selecting which of said left and right flow control valves need be switched to return the platform to a level condition;

ii) means for switching, when a non-level condition of the platform is detected and the switching valves are in said second position and the platform is being lowered, a selected one of said left and right electrically-activated flow control valves so as to cause said selected one of said flow control valves to switch from said first position allowing egress of hydraulic fluid from the lower end of an associated cylinder to said second position preventing egress of hydraulic fluid therefrom so as to stop the movement of an associated side of the platform to which an associated piston is coupled; and iii) means for switching, when a non-level condition of the platform is detected and the switching valves are in said first position and the platform is being raised, so as to cause said selected one of said flow control valves to switch from said second position allowing supply of hydraulic fluid to the lower end of an associated cylinder to said first position preventing supply of hydraulic fluid to the lower end of an associated cylinder so as to stop the movement of an associated side of the platform to which an associated piston is coupled.

12. The hydraulic platform lift as claimed in claim 11, further comprising:

means for preventing said automatic level control means from operating, in the event of failure thereof; and manually operated electrical switch means for switching, when the switch valves are in said first position and the platform is being raised, a selected one of said left and right flow control valves so as to cause it to move to said first position and thereby stop the associated cylinder from further movement, and for switching, when the switch valves are in said second position and said platform is being lowered, a selected one of said flow control valves so as to cause it to move to said second position so as to prevent egress of hydraulic fluid from the lower end of the associated cylinder so as to stop movement of the associated piston and the associated side of the platform to which the associated piston is coupled.

13. The hydraulic platform lift as claimed in claim 12, wherein said pump means comprises a pair of positive-displacement pumps, each pump adapted to supply hydraulic fluid under pressure to an associated cylinder, each of said associated cylinder, solenoid switching valve, flow control valve, and pump thereby forming two independent hydraulic circuits.

14. A vehicle-mounted hydraulic platform lift for use in raising and lowering a platform for loading cargo into, and unloading cargo from, a cargo storage area of a truck or truck trailer, comprising:

a) left and right vertically mounted, dual acting hydraulic cylinders which each utilize hydraulic fluid supplied at a lower end and upper end thereof to raise and lower, respectively, the platform;

b) each cylinder having:
   i) a first conduit in fluid communication with the lower end thereof to allow passage of hydraulic fluid to and from the lower end of the cylinder; and
   ii) a second conduit in communication with the upper end thereof; and
   iii) a third conduit in fluid communication with the lower end thereof to allow passage of hydraulic fluid from the lower end of the cylinder.

c) pump means for supplying hydraulic fluid under pressure to the cylinders;

d) a hydraulic fluid reservoir;

e) an electrically-activated switch valve to allow switching of hydraulic fluid from a first position whereby hydraulic fluid is supplied by said pump means to said lower end of said cylinders via said first conduit and simultaneously allowed to return to said reservoir from said cylinder via said second conduit, to a second position whereby hydraulic fluid is supplied to said upper end of said cylinders via said second conduit and simultaneously allowed to return to said reservoir via said first conduit;

f) left and right electrically-activated flow control valves associated with a respective left and right cylinder, in fluid communication with said third conduit, for controlling flow of hydraulic fluid out of the lower end of a respective cylinder to a reservoir via said third conduit;

g) each of said left and right flow control valves independently switchable when said platform is being raised or lowered, from a second position preventing egress of hydraulic fluid from the lower end of an associated cylinder via said third conduit, to a first position allowing egress of hydraulic fluid therefrom;

h) automatic level control means, comprising:
   i) means for detecting the non-levelness of the platform during raising or lowering thereof and selecting which of said left and right flow control valves need be activated to return the platform to a level position;
   ii) means for activating, when the platform is being lowered and said switching valve is in said second position and a non-level action of the platform is detected, a selected one of said left and right flow control valves so as to cause said selected one of said flow control vales to switch from said second position preventing egress of hydraulic fluid from the lower end of an associated cylinder to said first position allowing egress of hydraulic fluid therefrom, to thereby increase the movement of the associated side of the platform relative to the other side of the platform; and
   iii) means for de-activating, when the platform is being raised and said switching valve is in said first position and a non-level condition of the platform is detected a selective one of said left and right flow control valves so as to cause said selected one of said flow control valves to switch from said second position preventing egress of hydraulic fluid from the lower end of an associated cylinder to said first position allowing egress of hydraulic fluid therefrom, to thereby slow the rate of movement of the associated side of the platform relative to the other side of the platform.

15. The hydraulic platform lift as claimed in claim 14, further comprising:

means for preventing said automatic level control means from operating in the event of failure thereof; and manually operated electrical switch means for activating, when the switch valve is in the first position and the platform is being raised, a selected one of said flow control valves so as to cause it to move from said second position preventing egress of hydraulic fluid from the lower end of an associated cylinder to said first position allowing egress of hydraulic fluid therefrom, to thereby slow the rate of movement of the associated side of the platform relative to the other side, and when the switch valve is in the second position and the platform is being lowered, means for activating a selected one of said flow control valves so as to cause it to move from second position preventing egress of hydraulic fluid from the lower end of the associated cylinder to said first position allowing egress of hydraulic fluid therefrom, to thereby increase the rate of movement of the associated side of the platform relative to the other side of the platform.

16. A vehicle-mounted hydraulic platform lift for use in raising and lowering a platform for loading cargo into, and unloading said cargo from, a cargo storage area of a truck or truck trailer, comprising:

a) left and right vertically-mounted, dual acting hydraulic cylinders which each utilize hydraulic fluid supplied at a lower end and upper end thereof to raise and lower, respectively, the platform;

b) each cylinder having:
  i) a first conduit in communication with said lower end thereof to allow passage of hydraulic fluid to and from said lower end of said cylinder; and
  ii) a second conduit in communication with said upper end thereof;

c) pump means for supplying hydraulic fluid under pressure to said cylinders;

d) a hydraulic fluid reservoir;

e) left and right electrically-activated switch valves associated with a respective left and right cylinder, to allow switching of hydraulic fluid from a first position whereby hydraulic fluid is supplied by said pump means to said lower of said cylinder via said first conduit and simultaneously allowed to return to said reservoir from said cylinder via said second conduit to thereby raise an associated side of the platform, and a second position whereby hydraulic fluid is supplied to said upper end of said cylinders via said second conduit and simultaneously allowed to return to said reservoir via said first conduit to thereby lower the associated side of the platform;

f) left and right electrically-activated flow control valves, associated with a respective left and right cylinder and left and right switch valve, in fluid communication with said first conduit, for controlling flow of hydraulic fluid into or out of the lower end of a respective cylinder via said first conduit;

g) each of said left and right control valves independently switchable when the associated switch valve is in said second position, from a first position allowing egress of hydraulic fluid via said first conduit from the lower end of an associated cylinder to a second position preventing egress of hydraulic fluid therefrom, and when the respective switch valve is in said first position, from a second position allowing entry of hydraulic fluid via said first conduit into the lower end of an associated cylinder, to a first position preventing entry of hydraulic fluid into the lower end of said associated hydraulic cylinder;

h) automatic level control means, comprising:
  i) means for detecting the non-levelness of the platform during raising and lowering of the platform, and selecting which of said left and right flow control valves need be switched to return the platform to a level condition;
  ii) means for switching, when a non-level condition of the platform is detected and the switching valves are in said second position and the platform is being lowered, a selected one of said left and right electrically-activated flow control valves, and the associated switch valve, to switch from said first position allowing egress of hydraulic fluid from the lower end of an associated cylinder and preventing supply of hydraulic fluid to the lower end, to said second position preventing egress of hydraulic fluid from the lower end and allowing supply of hydraulic fluid thereto, and switching the associated switch valve from said second position to said first position, to thereby stop downward movement of an associated side of the platform to which an associated piston is coupled and cause the associated side to move in a upward direction;
  iii) means for switching when a non-level condition of the platform is detected and the switching valves are in said first position and the platform is being raised, a selected one of said left and right flow control valves and the associated switch valve, so as to cause said selected one of said flow control valves to switch from said second position allowing supply of hydraulic fluid to the lower end of an associated cylinder and preventing egress of hydraulic fluid from the lower end, to said first position preventing supply of hydraulic fluid to the lower end of an associated cylinder and allowing egress of hydraulic fluid therefrom, and switching the associated switch valve from said first position to said second position to thereby stop movement of an associated side of the platform to which an associated piston is coupled and cause the associated side to move in an upward direction.

17. The hydraulic platform lift as claimed in claim 16 further comprising:

means for overriding said automatic level control means, in the event of failure thereof; and manually operated electrical switch means for switching, when the switch valves are in said first position and the platform is being raised, a selected one of said left and right flow control valves so as to cause it to move to said first position and thereby stop the associated cylinder from further movement, and for switching, when the switch valves are in said second position and said platform is being lowered, a selected one of said flow control valves so as to cause it to move to said second position so as to prevent egress of hydraulic fluid from the lower end of the associated cylinder so as to stop movement of the associated piston and the associated side of the platform to which the associated piston is coupled.

* * * * *